United States Patent [19]
Oizumi

[11] Patent Number: 5,588,012
[45] Date of Patent: Dec. 24, 1996

[54] APPARATUS AND METHOD FOR ENSURING DATA IN EXTERNAL STORAGE SYSTEM

[75] Inventor: Yumiko Oizumi, Kawasaki, Japan

[73] Assignee: Fujitsu Limited, Japan

[21] Appl. No.: 992,450

[22] Filed: Dec. 17, 1992

[30] Foreign Application Priority Data

Feb. 10, 1992 [JP] Japan ..................................... 4-023750

[51] Int. Cl.$^6$ .................................................. G11C 29/00
[52] U.S. Cl. ........................................ 371/51.1; 371/40.1
[58] Field of Search .................................. 371/51.1, 67.1, 371/49.1, 49.2, 37.7, 38.1, 39.1, 40.1, 37.4; 395/525, 425, 185.01, 185.07, 185.06

[56] References Cited

U.S. PATENT DOCUMENTS

| | | | |
|---|---|---|---|
| 4,092,732 | 5/1978 | Ouchi | 364/900 |
| 4,188,616 | 2/1980 | Kazami | 340/146.1 |
| 4,672,609 | 6/1987 | Humphrey | 371/21 |
| 4,677,606 | 6/1987 | Ogata | 369/59 |
| 4,709,367 | 11/1987 | Grafe | 371/38 |
| 4,775,978 | 10/1988 | Hartness | 371/38.1 |
| 4,817,035 | 3/1989 | Timsit | 364/900 |
| 4,837,675 | 6/1989 | Bean | 364/200 |
| 4,849,927 | 7/1989 | Vos | 364/900 |
| 4,899,342 | 2/1990 | Potter | 371/10.1 |
| 4,993,029 | 2/1991 | Galbraith | 371/40.1 |
| 5,146,573 | 9/1992 | Sato | 395/425 |
| 5,182,752 | 1/1993 | Deroo | 371/37.7 |
| 5,185,746 | 2/1993 | Tanaka | 371/40.1 |
| 5,233,618 | 8/1993 | Glider | 371/68.1 |
| 5,239,637 | 8/1993 | Davis | 395/425 |
| 5,253,256 | 10/1993 | Oyama | 371/40.1 |
| 5,257,391 | 10/1993 | Du Lac | 395/800 |
| 5,283,791 | 2/1994 | Halford | 371/40.4 |
| 5,287,363 | 2/1994 | Wolf | 371/21.1 |
| 5,357,521 | 10/1994 | Cheng | 371/21.3 |
| 5,412,666 | 5/1995 | Squires et al. | 371/37.4 |

FOREIGN PATENT DOCUMENTS

| | | |
|---|---|---|
| 397023 | 4/1991 | Japan . |
| 3259464 | 11/1991 | Japan . |

OTHER PUBLICATIONS

A Case for Raid By David A. Patterson, Garth Gibson & Randy Katz 1988 Annual Conf Special Interest GP on Management of Data pp. 109–116 Association for Computer Machanery.

*Primary Examiner*—Robert W. Beausoliel, Jr.
*Assistant Examiner*—Ly V. Hua
*Attorney, Agent, or Firm*—Greer, Burns & Crain, Ltd.

[57] ABSTRACT

In an apparatus and method for ensuring data in an external storage system, the system includes an external storage controller for transferring read data from at least one external storage device, such as a magnetic disk drive, to a host device and for transferring write data from the host device to the external storage controller. The external storage controller adds to the write data from the host device check data including distinctive information on a position of the external storage device where the write data is written, transfers and writes the write data in the external storage device. Further, the external storage controller checks the check data included in the read data from the external storage device when the data is transferred to the host device by comparing the check data with a control check data computed and stored in the external storage controller.

13 Claims, 17 Drawing Sheets

| Fig. 4 A | Fig. 4 B |

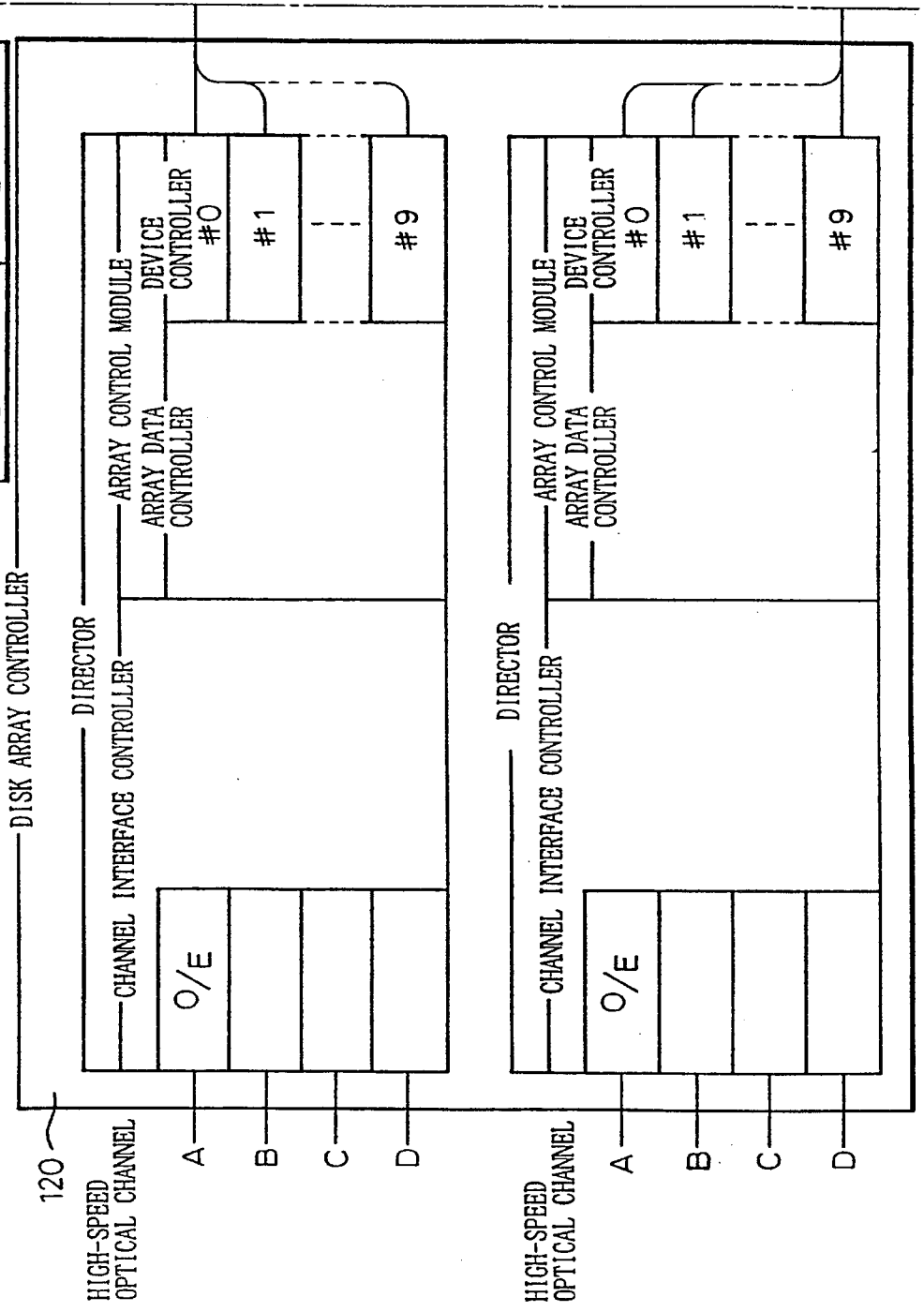

APPARATUS AND METHOD FOR ENSURING DATA IN EXTERNAL STORAGE SYSTEM

BACKGROUND OF THE INVENTION

1. Field of the Invention

The present invention relates to an apparatus and method for ensuring data for the purpose of confirming the normal operation of an external storage device, e.g., at least one magnetic disk drive, in an external storage system which controls the external storage device for writing and reading the data in and from recording medium such as a magnetic disk.

There is recently a tendency to demand, in a computer system, a transfer of large amounts of data at high speed, and therefore, an external (auxiliary) storage device, such as at least one magnetic disk drive, an optical disk drive (including a magneto-optical disk drive), or a magnetic tape drive, is also required to have a larger storage capacity and to transfer large amounts of data at high speed to exchange data with a host device.

In such a storage device, a data storage area to be accessed is controlled in accordance with a physical address of the recording medium and a logical address stored in the recording medium. Accordingly, in order to increase the recording density for the purpose of larger storage capacity, the data storage area is required to be accurately positioned by the mechanical operation of the storage device. Further, in such a computer system, it is required to possess an external storage controller having means to rapidly handle the erroneous operation of a storage device by means of an error detecting code, etc., so that reliability of the data can be ensured, together with an improvement of the accurate positioning technology of the recording medium itself.

On the other hand, to meet the requirement for transferring large amounts of data at high speed, an external storage device, e.g., a magnetic disk array device, has been also developed, which is mainly constituted by at least one logical device including a plurality of physical devices such as several units of disk drives and which enables plural bytes of data to be transferred in parallel between the host device and the logical device. Also, in this case, the reliability of large amounts of data is required to be ensured.

2. Description of the Related Art

Hereinafter, the description of a conventional apparatus for ensuring data in an external storage system in a computer system will be given with reference to FIGS. 1(A) and 1(B).

FIGS. 1(A) and 1(B) are a block diagram and a data format diagram each showing an apparatus for ensuring data according to a prior art.

In FIG. 1(A), indicated at 2 is a host device, e.g., a host computer in a computer system, and at 1 an external storage controller for controllably writing and reading data in and from an external storage device 3 which includes magnetic disk drives or the like, and which is adapted to write and read the data in recording media such as magnetic disks in the magnetic disk drives.

In this external storage system, when a write command is issued from the host device 2, the external storage controller 1 controllably locates the external storage device 3 at a target track, and transfers the data from the host device 2 to the external storage device 3 in which the data is written. When a read command is issued from the host device 2, the external storage controller 1 controllably locates the external storage device 3 at a target track, and transfers the data read from the device 3 to the host device 2.

In order to ensure the data transferred, data ensuring codes such as a CRC (Cyclic Redundancy Check) code, a check sum code, and an ECC (Error Correcting Code) are used. In the external storage controller 1 an error detecting code generating/checking circuit 10 is provided.

The data is ensured in the following manner. When the data is to be written, the content of the data to be ensured is calculated using a specific equation, and is added as a check data to the write data which is written in the storage device 3. When the data is to be read, the data including the check data is read, and a check data is calculated from the read data excluding the previously added check data. The read data is checked by comparing the thus calculated check data with the read check data.

There are two types of recording media of the external storage device 3 in terms of data format. In one type, each recording medium is regularly divided into blocks having a fixed length. In the other type, each recording medium is divided into blocks having a variable length with a distinctive ID. In either type, the external storage controller 1 specifies the data desired to be accessed by the block with a distinctive information (block ID), and reads or writes the data by the block.

Generally, an FBA format which is one of the former type as shown in FIG. 1(B) is used. In this format, each block consists of a block ID in accordance with which the controller recognizes the block, control information including information on a defective block, a replacement block, and a block length, and data. Behind the data is written the check data such as CRC data.

The external storage controller 1 handles the data stored only in the external storage device 3. When the write command is issued from the host device 2, the controller 1 adds the check data to the write data, and writes the write data including the check data in the storage device 3. When the read command is issued from the host device 2, the controller 1 reads the check data from the data from the storage device 3, checks the read check data, and transfers the read data excluding the check data to the host device 2.

In a control process as described above, when finding a target block ID, the external storage device 3 transfers the data corresponding to the found block ID to the controller 1 on the assumption that the data to be read next should be the data corresponding to that block ID.

However, the following problems have existed in such a construction according to the prior art of FIGS. 1(A) and 1(B).

(1) As shown in FIG. 1(B), there are cases where the storage device mistakenly accesses a block (n+1) and transfers the data contained in this block, although the controller 1 designated a block (n).

For instance, a sync (synchronizing) byte as indicated by hatched lines in FIG. 1(B) is written in order to identify the block ID and the leading end of the data. If the ID of the block (n) is correctly recognized, but the sync byte of the block (n) and the block ID of the block (n+1) cannot be recognized due to a mistake in reading the sync byte or some other cause, and accordingly the sync byte of the block (n+1) is recognized instead, then the data of the block (n+1) is transferred as the data of the block (n). Thus, even if the controller 1 checks the CRC data or the like based on the received data, no abnormality is detected because a data error has not occurred. Consequently, the data of the block (n+1) is transferred to the host device 2 despite the command to read the data of the block (n).

(2) If an arrangement is made such that the block ID or the like is transferred when the data is read, no error can be detected based on the check data when the data of the block (n) is read or the data of the block n+1) is read in the case where the data to be stored in the block (n) is written in the block n+1).

More specifically, data patterns of CRC code are usually composed of all "0" or all "1". Accordingly, no information on an address of a block in which the data is to be written or read is included in the CRC code. Therefore, the CRC code cannot be used to detect the above-mentioned error.

In view of these problems, it is the main object of the invention to provide an apparatus and method for ensuring data in an external storage system which are capable of ensuring data by confirming that the external storage device writes or reads data of a target address while data transfer is being executed.

It is a further object of the invention to provide an apparatus and method for ensuring data which are capable of ensuring easily that a data of the target address is read without increasing the data storage capacity.

It is a still further object of the present invention to provide an apparatus and method which can be applied to an array storage device such as a magnetic disk array device.

SUMMARY OF THE INVENTION

To attain the above objects, in the apparatus according to the present invention for ensuring data, the external storage system includes at least one external storage device such as a magnetic disk drive for writing and reading data in and from recording medium and an external storage controller for controlling the external storage device in accordance with a command issued from a host device, the external storage controller transferring read data from the external storage device to the host device and transferring write data from the host device to the external storage device. Further, the external storage controller is operative to add to the write data from the host device check data including distinctive information on a position of the external storage device in which the write data is written, and is operative to transfer the write data, to which the check data is added, to the external storage device.

Preferably, the external storage device is operative to check the check data from the external storage device while transferring the read data to the host device.

Further, preferably, the external storage controller comprises means for calculating the check data for checking the write data by using distinctive information on a position of the external storage device in which the write data is written as a seed value; means for calculating the check data from the read data by using the distinctive information on the position of the external storage device from which the read data is read as another sead value; and comparing means for comparing the calculated check data with the check data already included in the read data.

Further, preferably, the check code is a CRC code.

Further, preferably, the apparatus according to the present invention can be applied to an array storage device, e.g., a magnetic disk array device including a host interface controller and a plurality of device controllers to which a plurality of storage devices such as magnetic disk drives are connected, respectively.

Furthermore, various methods for ensuring data in an external storage system can be realized utilizing the same principles as that of the apparatus according to the present invention as described above.

DESCRIPTION OF THE PREFERRED EMBODIMENTS

Figure 1:
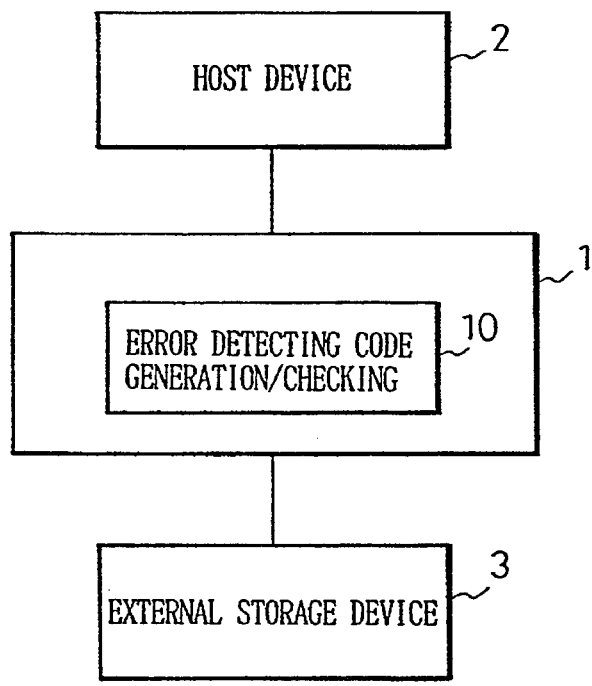
FIGS. 1(A) and 1(B) are a block diagram and a data format diagram each showing an apparatus for ensuring data according to a prior art.
Figure 1:
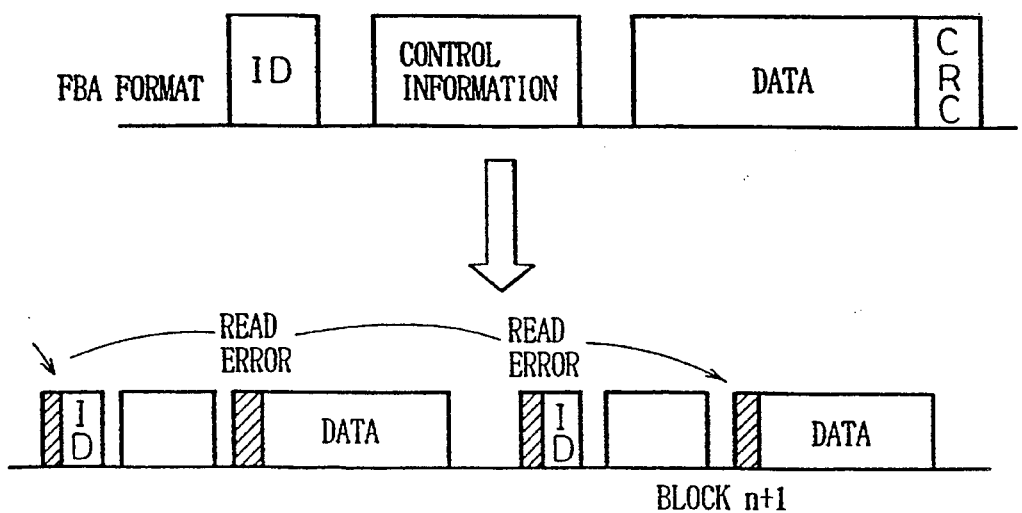
Figure 2:
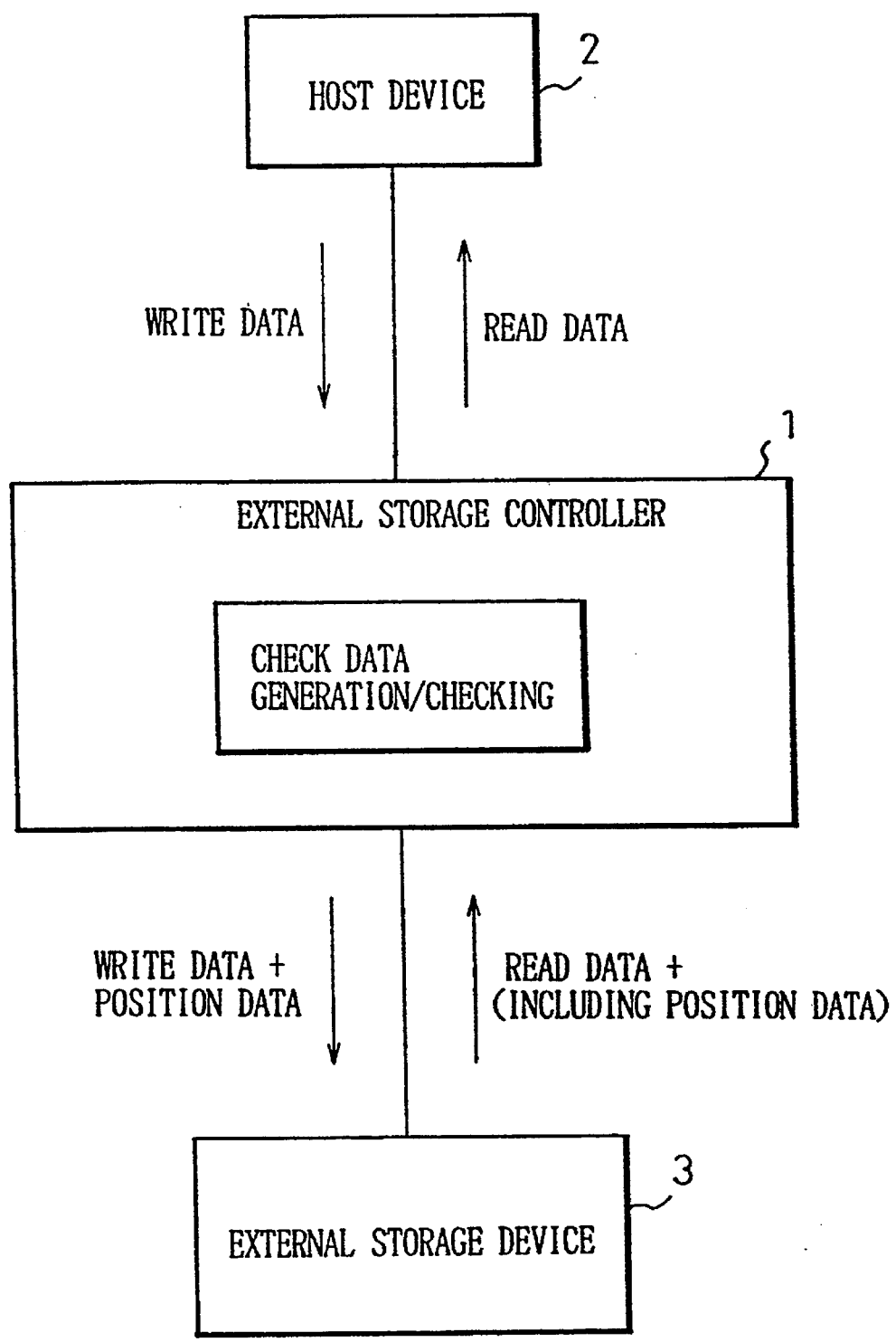
FIG. 2 is a block diagram showing an essential embodiment based on the present invention.

FIG. 2 is a block diagram showing an essential embodiment based on the present invention.

The embodiment shown in FIG. 2 is directed to a data ensuring process for an external storage system including an external storage device 3 for writing and reading data in and from a storage medium and an external storage controller 1 for controlling the external storage device 3 in accordance with an instruction issued from a host device 2, the external storage controller 1 transferring read data from the external storage device 3 to the host device 2 and transferring write data from the host device 2 to the external storage controller 1. Further, the external storage controller 1, which is provided with a check data generation/checking circuit, adds to the write data from the host device 2 check data including distinctive information on a position of the external storage device 3 in which the write data is written, transfers and writes the write data with the added check data in the external storage 3, and checks the check data included in the read data from the external storage 3 while transferring the read data to the host device 2.

Further, the embodiment shown in FIG. 2 is characterized in that, in controlling a transfer of the write data, the external storage controller 1 calculates the check data for checking the write data using the distinctive information on the position of the external storage device 3 in which the write data is written as a seed value and also characterized in that, in controlling a transfer of the read data, the external storage controller 1 calculates a check data from the read data using distinctive information on a position of the external storage device 3 from which the data is read as a seed value and compares the thus calculated check data with the check data included in the read data.

Further, the embodiment shown in FIG. 2 is characterized in that the check data is a CRC code.

Further, the embodiment shown in FIG. 2 is characterized in that a data storage system of the recording medium of the external storage device 3 is an FBA format.

According to the embodiment of FIG. 2, the check data including the distinctive information on the position of the external storage device 3 in which the write data is written is added to the write data from the host device 2, transferred and written in the external storage device 3. Further, when the data is transferred to the host device 2, the information on the storage position can be included in the read data so as to check the check data included in the read data from the external storage device 3. Thus, the data can be ensured by determining whether or not the data has been read from the designated position by means of data verification.

Further, according to FIG. 2, since the information distinctive of the designated position is handled as a seed value, such information can be included in the check data used to check the data. Thus, the data ensuring process can be realized without increasing the storage capacity.

Further, according to FIG. 2, since the check data is the CRC code, the data can be checked easily and it can be easily determined whether or not the data has been read from the designated position.

Further, according to FIG. 2, the data storage system of the recording medium of the external storage device 3 is in the FBA format. Thus, the storage position information can be included in a format in which no position information is included in the data, thereby facilitating the ensuring of the data.

Figure 3:
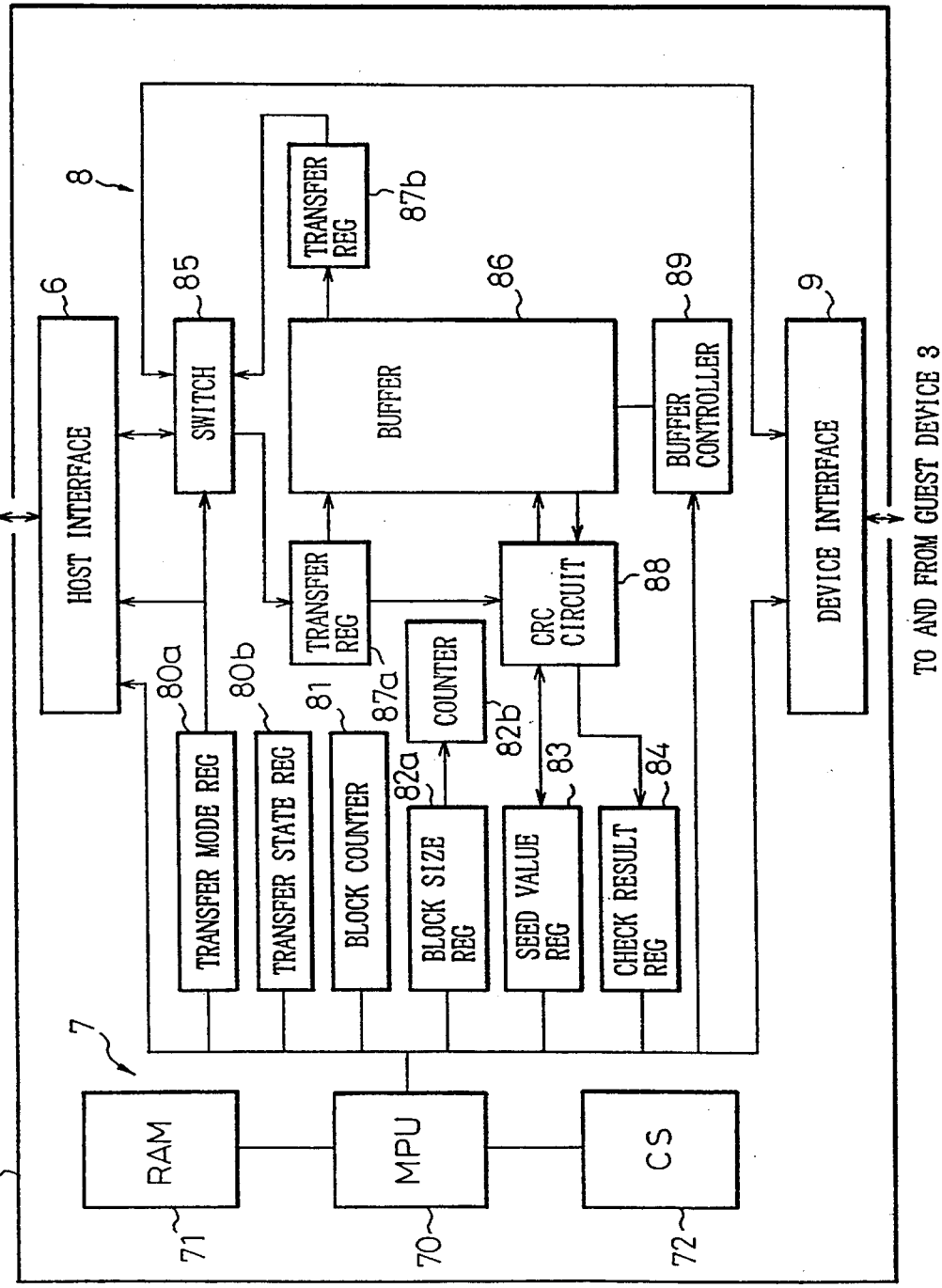
FIG. 3 is a block diagram showing a first embodiment according to the present invention.

FIG. 3 is a block diagram of a first embodiment according to the present invention showing a magnetic disk controller for controllably writing and reading data in and from a magnetic disk device formatted to have blocks of a fixed length (for example, the FBA format).

In this figure, indicated at 6 is a host interface for controllably interfacing a host device 2 with the disk controller, and at 7 a command control unit for controlling an external storage device (it will be also referred to as a magnetic disk drive, hereinafter) 3 and a transfer controller 8 to be described later in accordance with a command from the host device 2. The command control unit 7 includes a processor (MPU) 70, a RAM (random access memory) 71 for storing data, and a CS (control storage) 72 for storing a control program. The processor 70 controls the host interface 6, the transfer controller 8, and a device interface 9.

Indicated at 8 is a transfer controller for controlling a data transfer conducted between the magnetic disk drive 3 and the host device 2. A transfer mode (direction, type, start and end, presence or absence of CRC data) is set by the processor 70. The transfer controller 8 includes a transfer mode register 80a for controlling a switch 85, a transfer state register 80b for storing a transfer state, a block counter 81 for storing a transfer block number, a block size register 82a for storing the size of one block (number of bytes), a counter 82b for counting the transfer block number, a seed value register 83 for storing a seed value (initial value) of the CRC data, and a check result register 84 for storing the result of the checking.

The transfer controller 8 further includes the switch 85 for controlling a transfer direction in accordance with a content of the transfer mode register 80a, a data buffer 86 for storing transfer data, i.e., data to be transferred, an input transfer register 87a for storing the transfer data input to the buffer 86, an output transfer register 87b for storing the transfer data output from the buffer 86, a CRC circuit 88 for generating CRC check data from the data stored in the input transfer register 87a and from the seed value stored in the seed value register 83, and a buffer controller 89 for controlling the buffer 86.

Indicated at 9 is a device interface which is connected to the magnetic disk drive 3 so as to controllably interface the disk controller with the magnetic disk drive 3.

In this embodiment, a process for channels and a process including a standby routine executed while waiting for a magnetic disk of the magnetic disk drive to rotate can be carried in an asynchronous manner since the data buffer 86 has a sufficiently large capacity.

Figure 4:
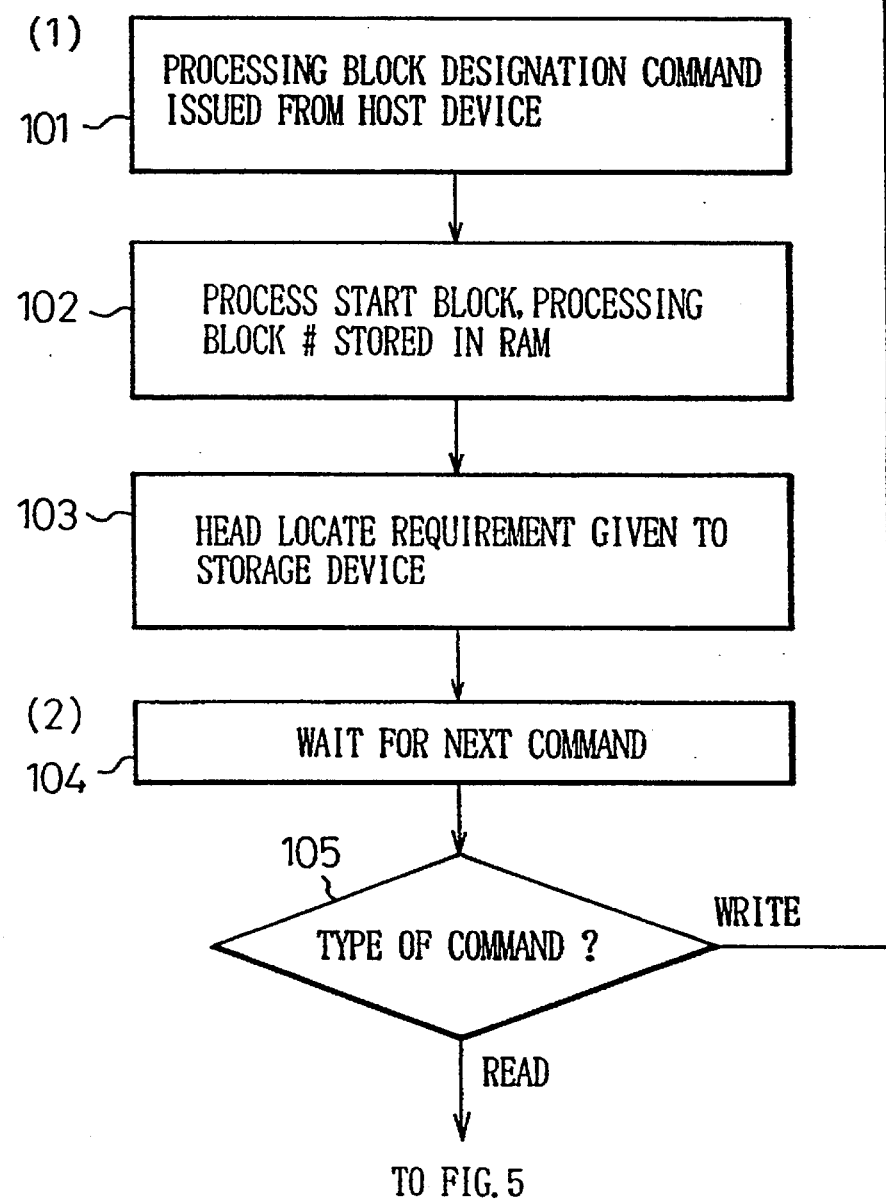
FIGS. 4(A) and 4(B) are flowcharts for explaining a process executed in a first embodiment according to the present invention.
Figure 4:
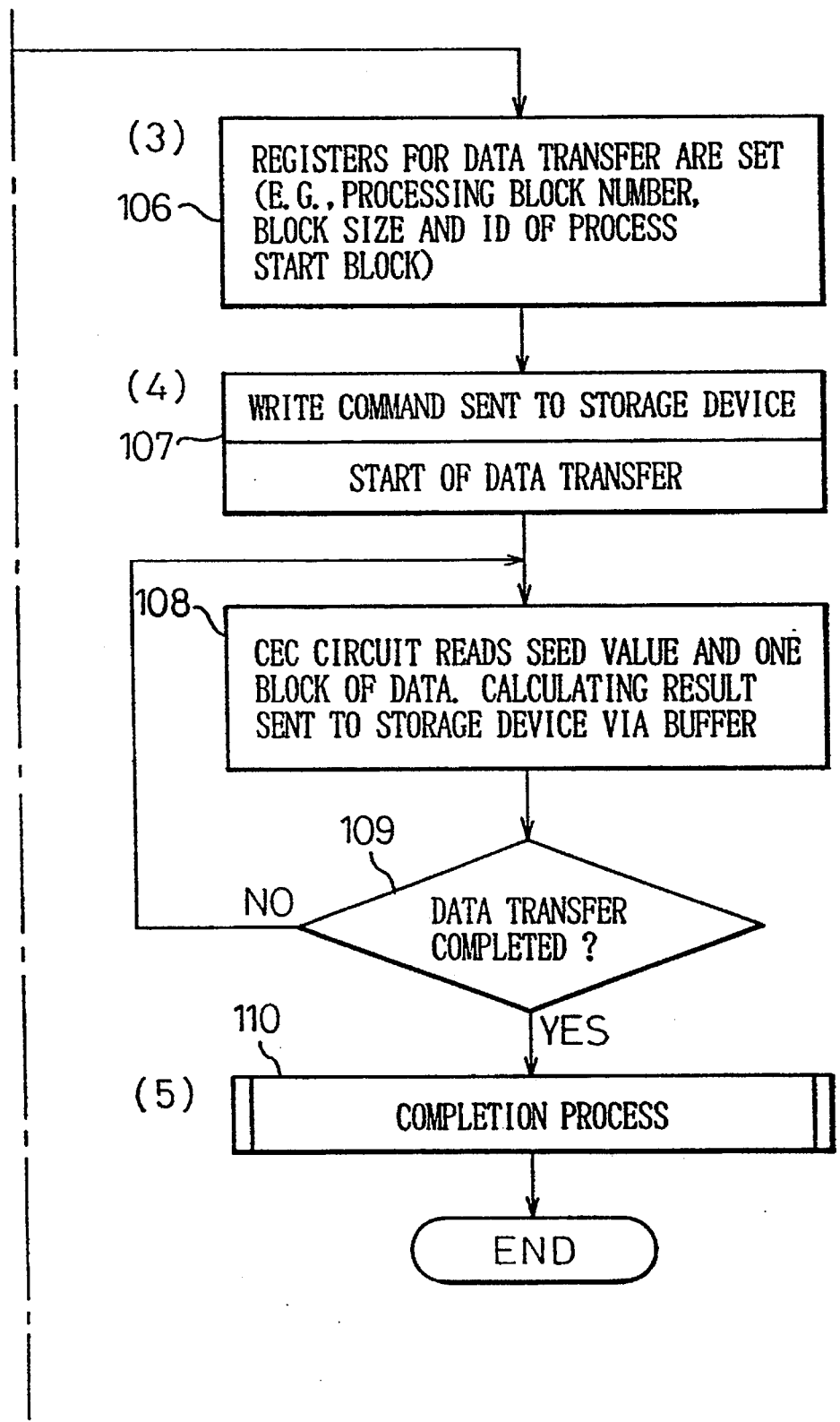
Figure 5:
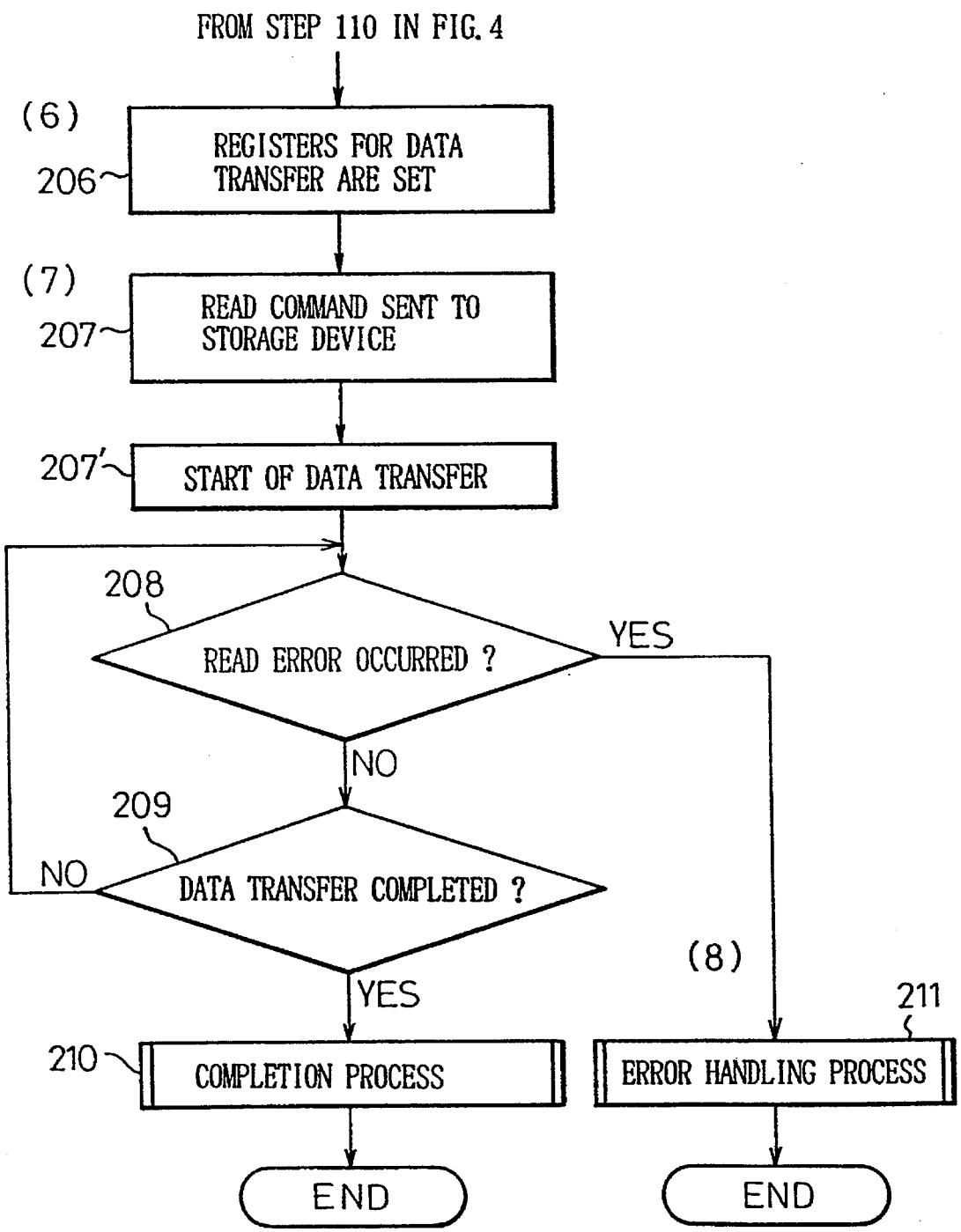
FIG. 5 is a flowchart for explaining the process executed in the first embodiment of the present invention similar to FIGS. 4(A) and 4(B)

FIGS. 4(A), 4(B) and 5 are flowcharts showing a process of the first embodiment of the present invention.

(1) A command which designates a block to be processed is issued from the host device 2 [Step (101)]. A process start block and a processing block number, i.e., the number of blocks to be processed, are included as parameters of this command.

Upon receipt of this command, the host interface 6 transfers this command to the processor 70. After storing the process start block and the processing block number in the RAM 71 [Step (102)], the processor 70 gives the magnetic disk drive 3 a locate requirement command so as to cause the disk drive 3 to locate at the process start block [Step (103)].

(2) The processor 70 waits for a next command to be issued [Step (104)], and discriminates whether or not the next command is a write command or a read command upon receiving the same [Step (105)].

(3) If the write command is issued, the processor 70 first sets various registers such as the register 80a used in controlling the data transfer.

More specifically, the processor 70 initializes the buffer controller 89, and sets the processing block number (e.g., 3), the block size (e.g., fixed length of 512 bytes), and the ID of the process start block respectively in the block counter 81, the block size counter 82a, and the seed value register 83 [Step (106)].

The processor 70 further designates a write mode in which the data does not include the CRC data when input to the buffer, but the data includes the CRC data when output from the buffer to the transfer mode register 80a, thereby instructing the start of the data transfer with the host device 2.

(4) In this way, the data transfer with the host device 2 is started [Step (107)]. Informed from the magnetic disk drive 3 through the device interface 9 that the head location has been completed while the data transfer is executed, the processor 70 sends a write command to the magnetic disk drive 3., thereby starting the data transfer to the magnetic disk drive 3 [Step (108)].

When the data transfer with the host device is started, the CRC circuit 88 reads the seed value from the seed value register 83, and uses the same as a seed value (initial value) in calculating the CRC data. Further, the value stored in the block size register 82a is copied in the counter 82b.

The data transferred from the host device 2 is stored in the transfer register 87a through the host interface 6 and the switch 85, and then input to both the data buffer 86 and the CRC circuit 88. The byte number in the counter 82b is decremented by one each time one byte of data is input [Step (108)].

The CRC circuit 88 carries out the calculation in accordance with a known operational expression (1) indicated below using the read seed value as an initial value [Step (109)]. Informed that the transfer of one block of data has been completed when the count value of the block counter 81 becomes zero, the CRC circuit 88 sends the calculation result to the buffer 86. The buffer controller 89 controls the buffer 86 so that the calculated CRC value is written in the buffer 86 following that block of data.

$$X^{16}+X^{15}+X^2+1 \qquad (1)$$

Upon completion of the transfer of one block of data, the CRC circuit 88 increments the content of the seed value register 83, and reads the incremented content. The CRC circuit 88 also decrements the content of the block counter 81, and copies the value of the block size register 82a in the counter 82b. Subsequently, a next block of data is written in the data buffer in a similar manner.

The processor 70 monitors the content of the transfer state register 82b, and causes the data transfer to continue unless the data transfer has been completed.

(5) When the content of the block counter 81 becomes "0", while the data transfer is continued in this way, i.e. all the data are transferred, a content, indicating that the data transfer with the host device is completed, is set in the transfer state register 80b. The processor 70 detects this, and resets the transfer mode with the host device in the transfer mode register 80a. Thereupon, the processor 70 finishes the data transfer [Step (110)], and informs the host device 2 through the host interface 6 that the write data has been completely written in the buffer 86.

Likewise, in the data transfer with the magnetic disk drive 3 which is executed asynchronously, when the data of the number of blocks written in the buffer 86 are completely transferred to the magnetic disk drive 3 through the transfer register 87b, the switch 85, and the device interface 9, and a content indicating that the data transfer with the storage device has been completed is set in the transfer state register 80b. The processor 70 detects this, and informs the host device 2 that the write data has been completely transferred to the magnetic disk drive 3.

As described above, the CRC data reflecting the block ID is added to each block of data, which is then written in the magnetic disk drive 3.

(6) On the other hand, if the received command is discriminated to be a read command in Step (10), the processor 70 sets various registers such as the register 80a used in controlling the data transfer [Step (206)].

More specifically, the processor 70 initializes the buffer controller 89, and sets the processing block number (e.g., 3), the block size (e.g., fixed length of 512 bytes), and the ID of the process start block respectively in the block counter 81, the block size counter 82a, and the seed value register 83.

The processor 70 further designates a read mode in which the data includes the CRC data when input to the buffer, but does not include the CRC data when output from the buffer to the transfer mode register 80a.

(7) Informed from the magnetic disk drive 3 through the device interface 9 that the head location has been completed, the processor 70 sends a read command to the magnetic disk drive 3 [Step (207)], thereby starting the data transfer to the magnetic disk drive 3 [Step (207')].

When the data transfer is started, the CRC circuit 88 reads the seed value from the seed value register 83, and used the same as a seed value (initial value) in calculating the CRC data. Further, the value stored in the block size register 82a is copied in the counter 82b.

The data transferred from the magnetic disk drive 3 through the device interface is stored in the transfer register 87a through the switch 85, and then input to both the data buffer 86 and the CRC circuit 88. The byte number in the counter 82b is decremented by one each time one byte of data is input.

The CRC circuit 88 carries out the calculation in accordance with the aforementioned known operation expression using the read seed value as an initial value [Step (208)]. Informed that the transfer of one block of data has been completed when the count value of the counter 82b becomes zero, the CRC circuit 88 receives the CRC data of the read data from the buffer 86, and compares the received CRC data with the calculated value. The CRC circuit 88 writes the comparison result in the check result register 84. The processor 70 reads this check result.

Upon completion of the transfer of one block of data, the CRC circuit 88 increments the content of the seed value register 83 by one, and reads the incremented content. The CRC circuit 88 also decrements the content of the block counter 81 by one, and copies the value of the block size register 82a in the counter 82b. Subsequently, a next block of data is written in a similar manner.

The processor 70 monitors the content of the transfer state register 80b, and causes the data transfer to continue unless the data transfer has been completed [Step (209)].

When the content of the block counter 81 becomes "0" while the data transfer is continued in this way, i.e., all the data are transferred, a content indicating that the data transfer with the storage device is completed is set in the transfer state register 80b. The processor 70 detects this, and resets the transfer mode in the transfer mode register 80a [Step (210)]. Thereupon, the processor 70 finishes the data transfer with the storage device.

When the data transfer with the storage device is completed without an error, the normal operation of the data can be confirmed. Accordingly, the processor 70 starts transferring the data written in the buffer 86 to the host device 2.

More specifically, the processor 70 sets the block size stored in the block size register 82a in the counter 82b, and decrements the count value of the counter 82b by one each time one byte of data is transferred to the host device 2. The one block of data is completely transferred when the count value of the counter 82b becomes zero. Accordingly, the CRC data input to the transfer register 87b next is not handled.

At this time, the data transfer is continued until the count value of the block counter 81 becomes "0".

(8) On the other hand, the processor 70, which has been waiting for completion of the data transfer with the external storage device (magnetic disk drive) 3 in Steps (207) to (208), internally retries the data transfer if a CRC error is detected from the content of the check result register 84. Thus, after completion of the data transfer with the storage device, the processor 70 sends a head locate command to the storage device 3 again to repeat Steps (207) to (208).

In the case where the data cannot be read from the storage device 3 correctly even in the retried data transfer, the processor 70 informs the host device 2 of an error [Step (211)], and completes the data transfer.

In this way, when the data are read, the CRC data is calculated from the read data using the read address (block ID) of the magnetic disk drive as a seed value. The calculated CRC data is compared with the CRC data added to the read data, thereupon it is discriminated whether or not the data is valid and whether or not the magnetic disk drive 3 has read the data of the designated block.

Thus, the data which has been ensured as valid data and as data of the designated block can be transferred to the host device 2.

Figure 6:
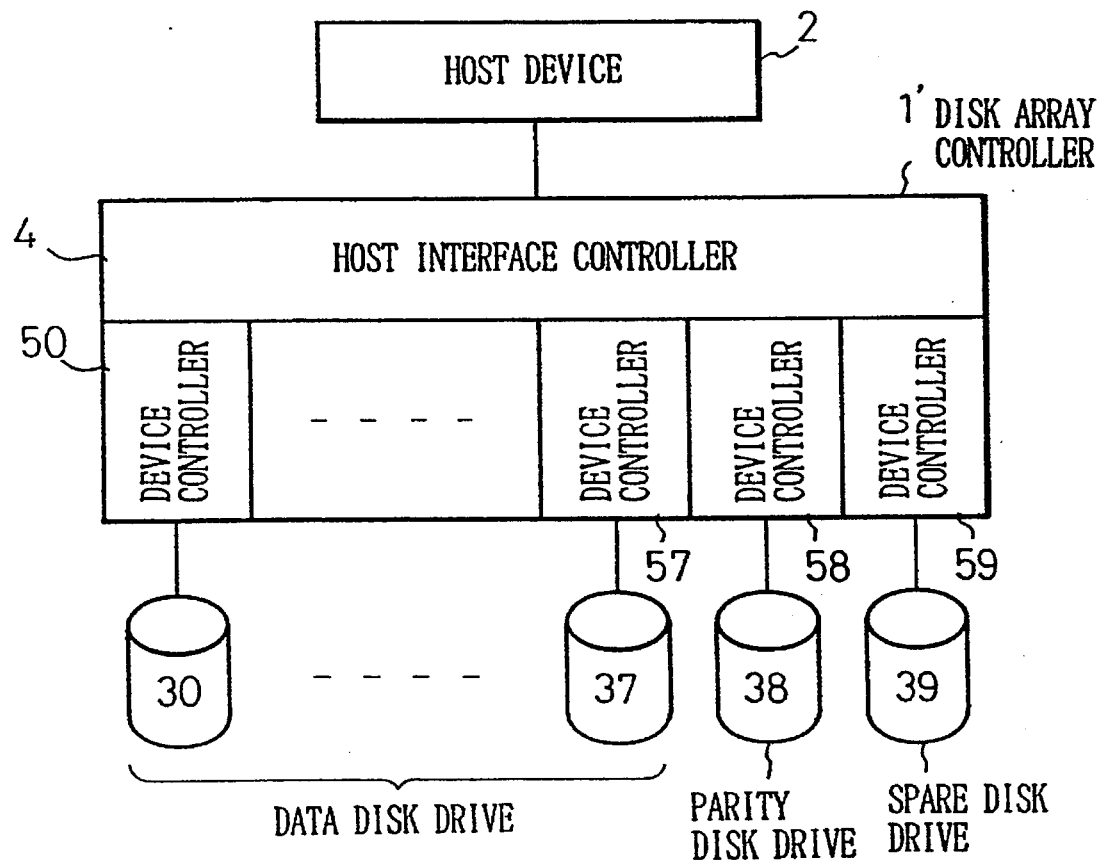
FIGS. 6(A) and 6(B) are block diagrams each showing a second embodiment according to the present invention.
Figure 6:
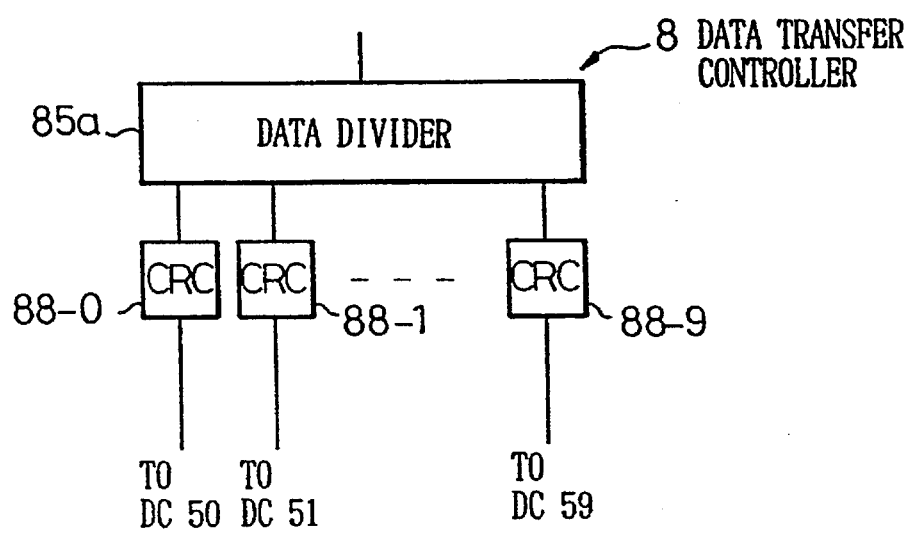
Figure 7:
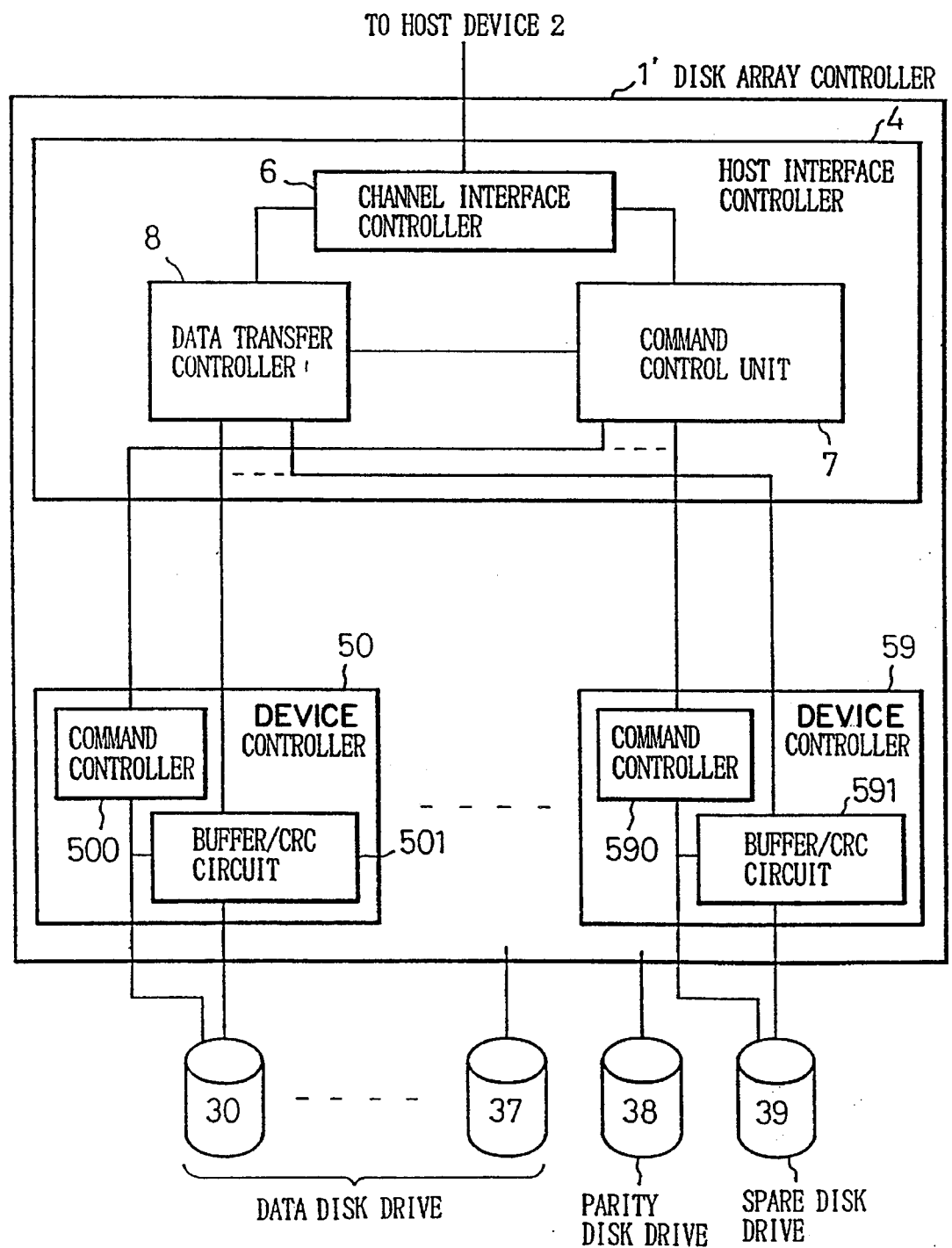
FIG. 7 is a block diagram showing the second embodiment according to the present invention similar to FIGS. 6(A) and 6(B)

FIGS. 6(A), 6(B) and 7 are diagrams showing a disk array system as a second embodiment of the present invention.

As shown in FIG. 6(A), in the disk array system which is composed of one disk array device, a disk array controller 1' connected to a host device 2 includes a host interface controller 4, and device controllers 50 to 59 for controlling magnetic disk drives 30 to 39 (data disks 30 to 37, parity disk 38, and spare disk 39).

Here, a general description of a disk array device will be given in more detail.

In general, in a single unit of a magnetic disk drive, data transfer speed is limited by a rotation speed of a motor which rotates a magnetic disk as a recording medium. Accordingly, if it is intended to attain high speed operation by increasing a data transfer speed, it is necessary to perform read/write operations in parallel by driving a plurality of disk drives, called a disk array device, simultaneously. At this time, in response to a command from a host device, the spindle motors of the magnetic disk drives such as disk array device connected in parallel with the host device are synchronously rotated, so that it becomes possible to perform a parallel transfer of data.

Further, in addition to the data transfer at high speed, fault tolerance of the whole system is also required for the disk array device so that sufficient reliability of the large amounts of data can be ensured without decreasing the data transfer speed.

To attain such a fault tolerant system, even though a failure, such as the inability to read data from one disk drive of a plurality of disk drives, has occurred, it is necessary for the disk array device to be constructed so that the data of the failed disk drive can be reconstructed immediately without stopping the whole system of the disk array device.

Some kinds of disk array devices in practical use, in which the above-mentioned data transfer at high speed and the fault tolerance can be satisfied simultaneously, have begun to be announced by various computer manufacturers as disk array devices called RAID (Redundant Arrays of Inexpensive Disks) 1 to RAID 5.

Among these RAIDs 1 - 5, RAID 3, which is especially adequate for the case where large amounts of data have to be processed continuously at high speed, e.g., scientific calculations, will be described in more detail.

In the RAID 3, the disk array device typically includes a plurality of disk drives for data transfer (for example, eight (8) disk drives) and a disk drive for parity checking, all these disk drives operating in parallel simultaneously. In this case, some given parity data corresponding to the parallel data of the respective disk drives for data transfer are previously stored in the disk drive for parity checking (parity disk drive). In such a construction, even though one disk drive of a plurality of disk drives fails so that the data cannot be read out, the data can be reconstructed by reading the parity data from the parity disk drive.

Further, in the RAID 3, a spare storage disk drive is also provided. All the data in the failed disk drive is automatically reconstructed and transferred into the spare storage disk drive. If the reconstruction process is completed, the spare storage disk drive can be utilized as a normal disk drive, in cooperation with the other disk drives for data transfer.

In this manner, the disk array device as represented by the RAID 3, which enables large amounts of data to be transferred at relatively high speed (for example, 36 MBytes/sec) and has substantially fault tolerant characteristics, can be prepared.

To be more specific, in this disk array system constituted by the disk array device, there are provided a plurality of magnetic disk drives (e.g., eight) for carrying out normal data input/output, a magnetic disk drive for parity data (parity disk drive), and a spare magnetic disk drive (spare disk drive, or hot standby disk drive).

The parity disk drive is adapted to store a parity disk. For instance, if one of the magnetic disk drive for carrying out the normal data input/output fails and it becomes impossible to read data stored therein, the lost data can be reconstructed instantaneously from the parity disk drive.

The data stored in the failed disk drive is automatically reconstructed and transferred to the spare disk drive. Upon completion of the data reconstruction, the spare disk drive is used to carry out the normal data input/output.

Incidentally, a process has been conventionally executed which detects a fixed error of the respective magnetic disk drives constituting the disk array system, evacuates the content of the failed disk device, and detaches the failed disk drive from the disk array system. However, this process is executed after, for example, it becomes possible to process on-line in a normal operation.

The above process is executed when a host device actually executes a locating, or read/write operations to the disk array system, and some error is detected.

More specifically, the host CPU issues a read/write command in order to use the disk array system, but this command ends up as an error. After the command is retried a specified number of times, a data evacuation process and a detaching process (a process of logically detaching the failed disk from the disk array system) are executed.

Further, as shown in FIG. 7, the host interface controller 4 includes a channel interface controller 6 connected to the host device 2, a command control unit 7 connected to the channel interface controller 6 and adapted to control the respective device controllers 50 to 59, and a data transfer controller 8 connected to the channel interface controller 6 and the command control unit 7 and adapted to transfer data to and from the device controllers 50 to 59.

The device controllers 50 to 59 include command controllers 500 to 590 for controlling the locating operation and the data transfer, and buffer/CRC circuits 501 to 591 for executing the data transfer with the data transfer controller 8.

On the other hand, as shown in FIG. 6(B), the data transfer controller 8 includes CRC circuits 88-0 to 88-9 provided between a data divider 85a and the device controllers (DC) 50 to 59.

In this disk array system, the magnetic disk drives 30 to 39 are accessed in parallel. Accordingly, the block ID added to a logical block of 4096 bytes which is recognized by the host interface controller 4 corresponds to the block IDs added to the block for the physical magnetic disk drives of 512 bytes constituting the logical block.

As operation of the disk array system is described below. In the case where the spare disk 39 is not used, the command control unit 7 sets seed values in the respective CRC circuits 88-0 to 88-9 of the data transfer controller 8 when the data is written. The CRC data reflecting the block ID are calculated by the CRC circuits 88-0 to 88-9, and is added to respective block data (512 bytes per block). Then, the respective block data are distributed into the device controllers 50 to 58, in which the block data have the CRC data thereof checked while being buffered. Thereafter, the block data are written in the magnetic disk drives 30 to 39.

When the data are read, the command control unit 7 sets the seed values in the respective CRC circuits 88-0 to 88-9 of the data transfer controller 8. After having the CRC data thereof checked while being buffered in the buffer/CRC circuits 501 to 581, the data read from the magnetic disk drives 30 to 38 are transferred to the data transfer controller 8, and the CRC data thereof are checked in the CRC circuits 88-0 to 88-8 of the data transfer controller 8.

Upon detecting an error, the data transfer controller 8 reconstructs the block data stored in the magnetic disk drive corresponding to the error using the magnetic disk drives (e.g., 31 to 38) excluding the faulty magnetic disk drive (e.g., 30), and then transfers the data to the host device 2.

For the block in which a data error has occurred, the data reading operation is retried internally later. If the retry fails, a replacement block is allotted, and the restored physical block (512 bytes) is written in the replacement block.

With this process, the CRC data are checked in both the data controller 8 and the device controllers 50 to 59, thereby enabling detection of the data error which occurs between the data transfer controller 8 and the device controllers 50 to 59.

Here, more concrete description of the disk array system, to which the present invention can be applied will be given with reference to FIGS. 8 and 9.

Especially, in FIGS. 8 and 9, the principle of automatic data reconstruction in a disk array device will be described. In this case, the error check and correction process of read data will be representatively explained.

Figure 8:
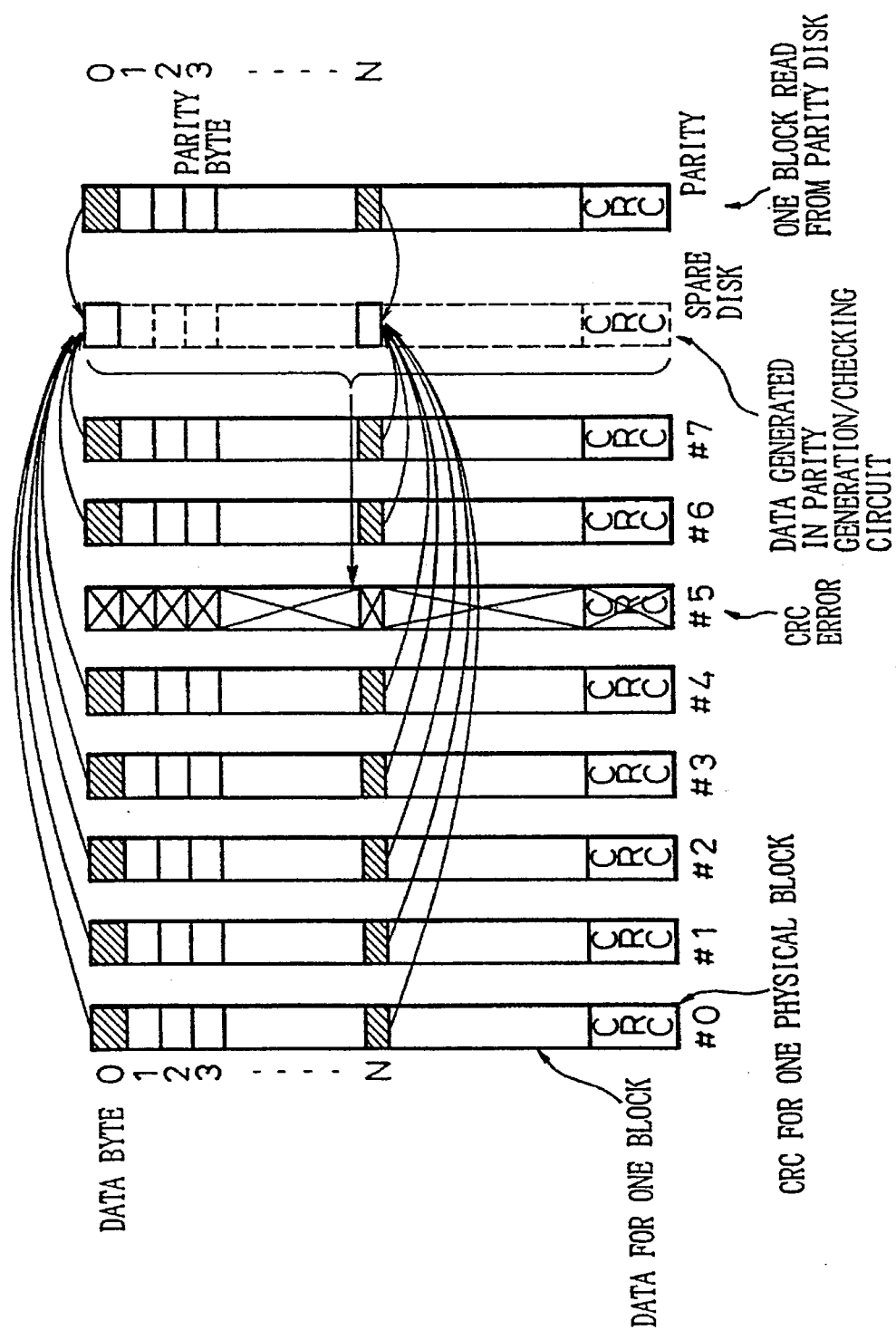
FIG. 8 is a schematic diagram for explaining the principle of automatic data reconstruction in a disk array device.

As shown in FIG. 8, in this disk array system constituted by the disk array device, there are provided eight magnetic disk drives #0-#7, for carrying out normal data input/output, a magnetic disk drive for parity data (parity disk drive), and a spare magnetic disk drive (spare disk drive). In FIG. 8, the data of one block in the respective disk drives are typically illustrated.

The read data is checked and corrected as follows:

(1) Each device controller reads a block with an error from each disk as instructed from the array data controller.

(2) Each device controller checks a CRC code assigned to each physical block. When a CRC error is detected in a disk block, the device controller informs the array data controller of the occurrence of the CRC error. Now, it is assumed that the CRC error has occurred in the physical block #5.

(3) The array data controller ignores the data in the physical block (#5) from which an error has been informed, and uses instead data #5 that is automatically reconstructed by the parity data generation circuit from the data (#0 to #4, #6, #7 and parity) in the physical block read from other device controller to combine the data list and to transfer the read data to the host device. The combined data is finally transferred to the spare storage disk drive and the spare storage disk drive can be used as a normal disk drive.

Figure 9:
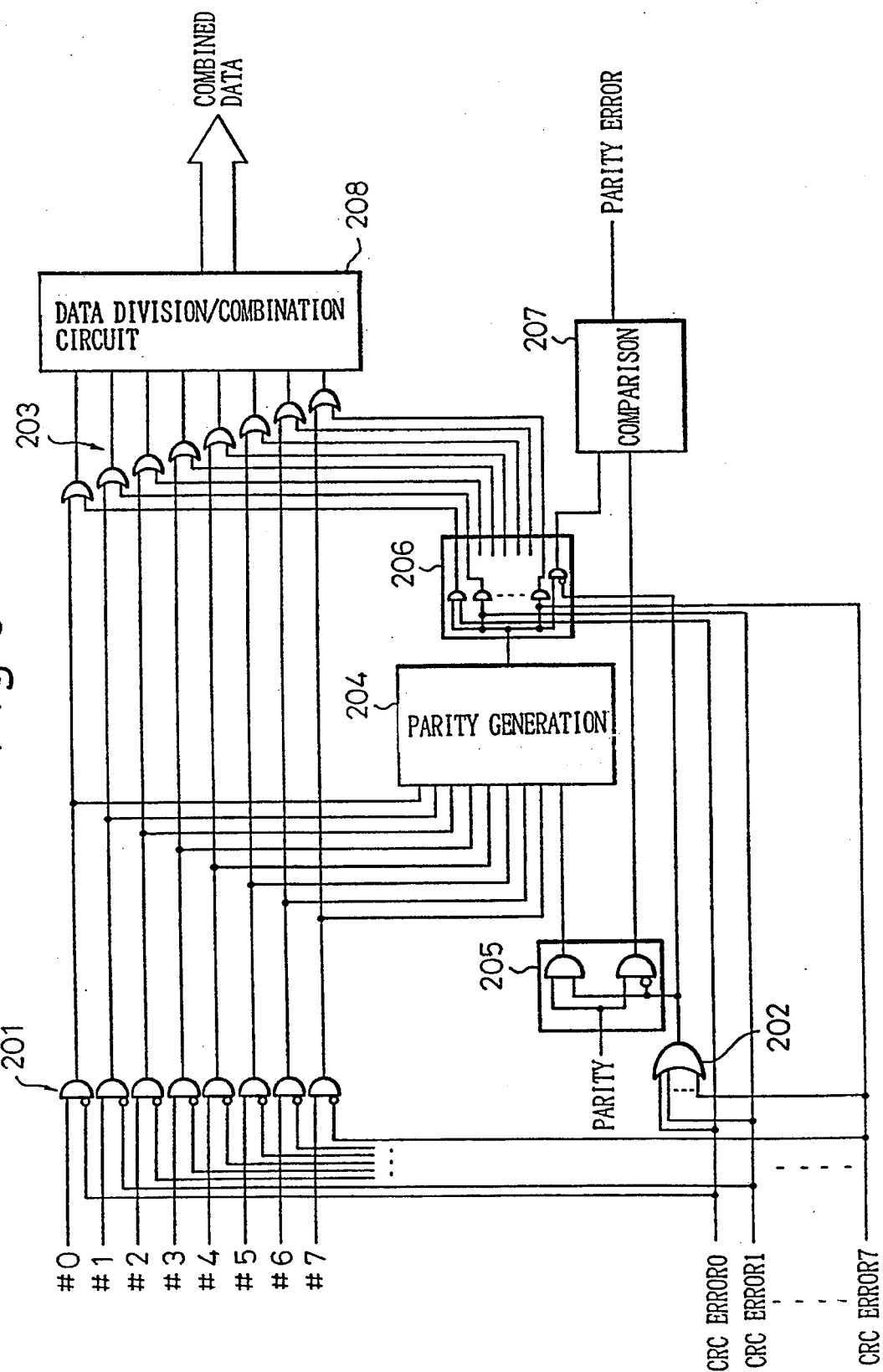
FIG. 9 is a block diagram showing data reconstruction of FIG. 8 more concretely.

FIG. 9 is a block diagram showing data reconstruction of FIG. 8 more concretely.

To be more specific, FIG. 8 illustrates the detail of data transfer controller 8 shown in FIG. 7.

In FIG. 7, 201 denotes check gates for CRC check, i.e., CRC error detection. The check gate 201 are provided corresponding to the respective disk drive. Further, data signal is input in one of two input terminals of each gate 201, while error signal is input in the remaining one of the input terminals as a negative logical signal.

Further, 204 denotes a parity generation circuit for generating parity data by means of a switching operation of a first switch 205 and a second switch 206. 207 denotes a comparison circuit for confirming the occurrence of CRC error (parity error). 208 denotes a data division/combination circuit for dividing data into a plurality of data blocks each having CRC in write operation and for combining the divided data in read operation.

Here, it is assumed that the CRC error has occurred in any block of the disk drive #5. In this case, an error signal ( $\overline{\text{CRC ERROR 5}}$ ) of #5 becomes "0" (Low Level), and only output level of the gate #5 among eight check gates 201 becomes "0".

When there is no CRC error, the first switch 205 is connected to the comparison circuit 207 via a first OR gate 203 and the input level therefrom of the comparison circuit 207 becomes "0". Further, the other input level from a second switch also becomes "0". In this way, comparison result of the comparison circuit 207 indicate that two inputs correspond with each other and there is no error.

On the contrary, when a CRC error has occurred in the disk drive #5, the output of the first OR gate 202 becomes "1", and the first switch 205 is transferred to the parity generation circuit 204.

Further, in the parity generation circuit 204, only the input corresponding to the disk drive #5 becomes "0" and therefore the parity data is generated from all the disk drive other than #5. The generated parity data from 205 is sent to the data division/combination circuit 208 via a second switch 206 and via a plurality of second OR gates 203. In this case, it should be noted that the data of the disk drive #5 is inhibited by means of the corresponding OR gate 203. Consequently, the automatically reconstructed data is sent to the data division/combination circuit 208 via such OR gates 203 serving as error correcting circuitry. Finally, correctly combined data is output from the data division/combination circuit 208, even when the CRC error has occurred in one block.

Figure 10:
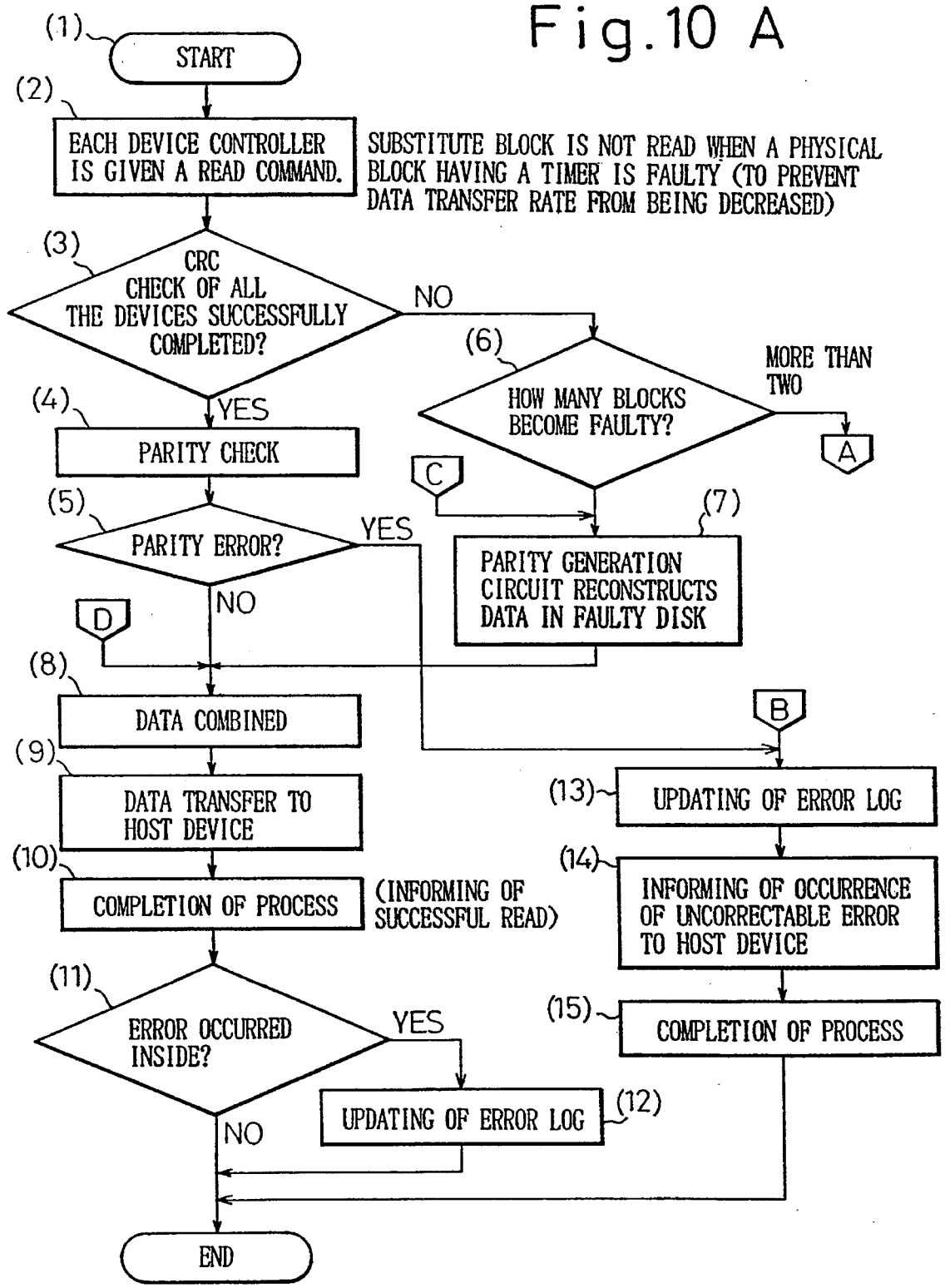
FIGS. 10(A) and 10(B) are flowcharts for explaining read operations in any embodiment of a disk array device more concretely.
Figure 10:
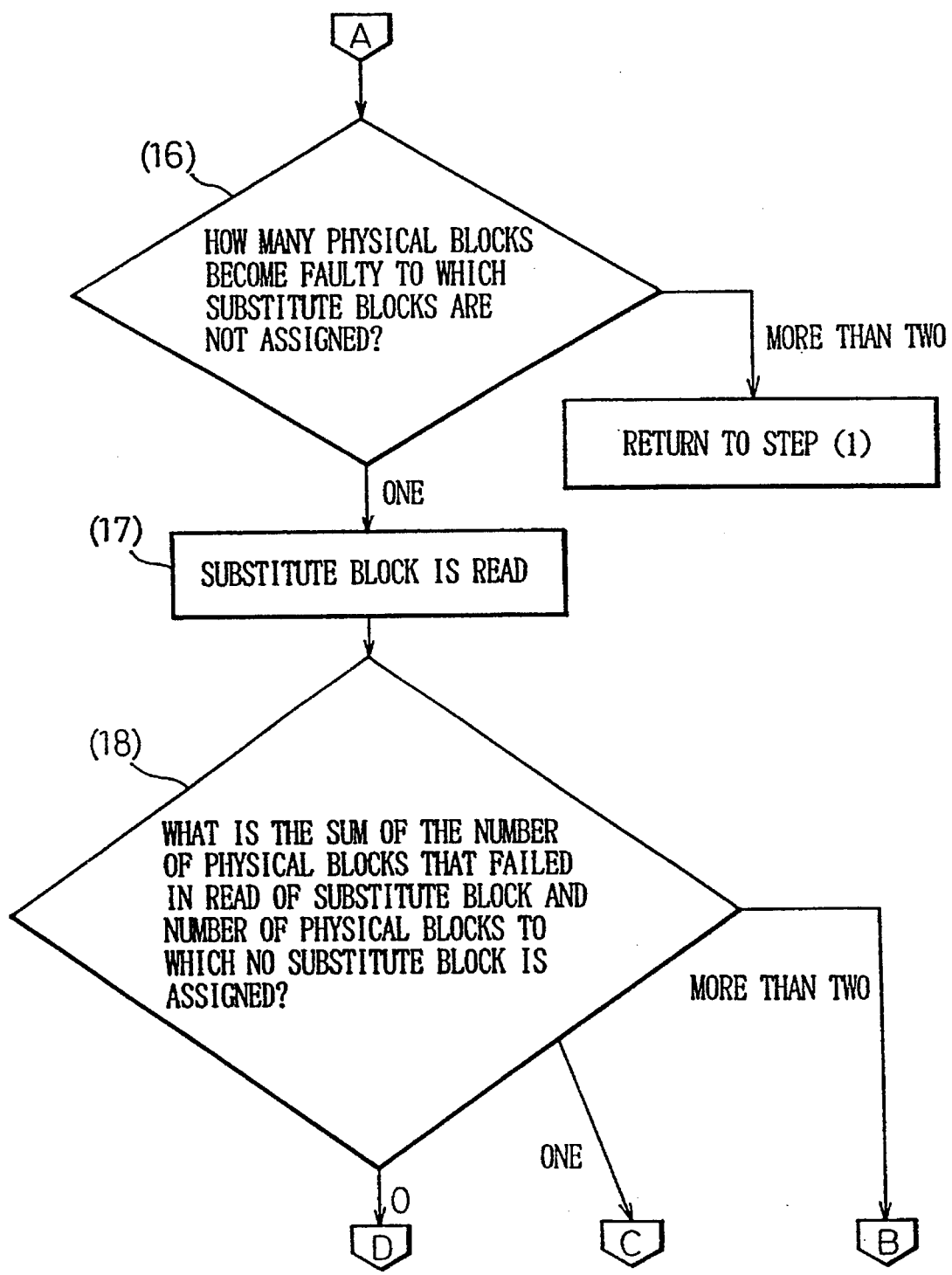

Further, in FIGS. 10(A) and 10(B), the data checking process, in the case where the present invention is applied to a disk array system, are illustrated in flowcharts. In this figure, it is assumed that a disk (or disk drive) #2 made a positioning error. Here, the flowcharts of FIGS. 10(A) and 10(B) should be referred to.

During read operation, the device controller which read the data from a plurality of disks including the disk #2 checks whether or not there is an equality between CRC codes [Steps (1) to (4) in FIG. 10(A)]. When the equality is found between CRC codes, CRC check in read operation of all the devices is successfully completed and the array data controller compares the parity generated from the data in the read disks #0 to #7 with the data read from the parity disk. However, in this case, a parity error takes place since the parity is generated by utilizing the incorrect data read from a block of a disk other than #2, with regard to disk #2 [step (5) in FIG. 10(A)].

In a conventional data checking process, it is possible to know which of the data read from the disks #0 to #7 and the parity disk is incorrect, but it is not possible to know in which respect the data is incorrect. Therefore, the data cannot be corrected, and the error is informed to the host device. Since the faulty point is not known, even if such an error has occurred many times, it is not possible to switch the faulty disk to the spare disk. Each time a check for inequality between the read data is executed, an error will take place repeatedly.

To find a faulty disk, write, read and data comparison must be done with each of the physical disks. These operations must be performed from the host device, unless special buffer and program are prepared for the disk array device.

This is disadvantageous for the disk array device for which high reliability is required.

On the other hand, as shown in FIGS. 10(A) and 10(B), in the case where the disk drives similar to that used in the aforementioned disk array device are used in a disk array device to which the present invention is applied, it is possible to detect in the CRC check with a distinctive information that a block is accessed for data write, while another block is accessed for data read [Steps (5)], and it is possible for the data to be automatically reconstructed. Namely, CRC check including a distinctive information is executed, and therefore the failed disk drive (e.g., #2) can be deleted easily. Accordingly, even when the CRC error has occurred [Step (6)], if the CRC error occurs in one block, the data reconstruction process can be automatically performed by means of a parity generation circuit. Therefore, a parity error does not occur. The disk array controller which is informed that a CRC error regenerates, by the parity generation circuit, data which otherwise would be read from the faulty disk drive [Step (7)], and rearranges [Step (8)] and transfers it to the host device as in the case where no read error has taken place [Steps (9) to (11)]. When a faulty disk drive can be discriminated in Step (3), the disk array device detaches the faulty disk drive from the circuitry when such errors have accumulated to more than predetermined times, and shifts to an operation using the spare disk [Step (4)]. However, even when the error still occurs inside the disk array system, it is impossible for the data to be reconstructed and therefore updating of error log is executed [Step (12)].

Also, when the parity error occurs in Step 5, updating of error log is executed [Step (13)], and the data transfer controller informs the host device that the uncorrectable error has occurred to complete the read process [Steps (14) and (15)].

Further, when the CRC error is detected in more than two blocks (two disks), the data transfer controller checks the number of blocks which are not assigned to a spare disk [Step (16)].

If there is only one disk that is not assigned, a substitute disk is read out [Step (17)]. If there is no error in a substitute disk, the failed data is successfully reconstructed [Step (18)]. In either case, if the number of the failed disks is more than two, the data reconstruction process cannot be performed and the updating of error log is executed. Thus, the present invention is preferably applicable to a disk array system as well as other embodiments.

Besides the foregoing embodiments, the present invention can be modified in the following manner.

(1) In the foregoing embodiments, the CRC data is used as data reflecting the block ID. However, the block ID may be written in a data field before or after the data to be checked.

(2) In addition to the CRC data, a check sum code, an ECC, or the like known code may be used as the check data.

(3) Although described with respect to a magnetic disk device in the foregoing embodiments, the invention is applicable to a magneto-optical disk drive, a magnetic tape drive, an erasable optical disk drive, a semiconductor disk drive, or the like storage device.

While the invention is described as related to the embodiments, various changes and modifications may be made in the present invention without departing from the spirit and scope thereof.

As described above, the embodiments according to the present invention demonstrate the following effects.

(1) Write data from a host device 2 has check data including distinctive information on a position of an external storage device 3 where the write data is written, added thereto, and is transferred and written in the storage device 3. Storage position information can be included in read data transferred to the host device 2 so as to check the check data included in the read data from the storage device 3. It is determined whether or not the data has been read from a designated position by verifying the data, thereby confirming the misoperation of a guest device.

(2) Thus, the data which has been ensured to carry no error while the guest device is operating properly can be transferred to the host device, which improves the reliability of the data.

Figure 11:
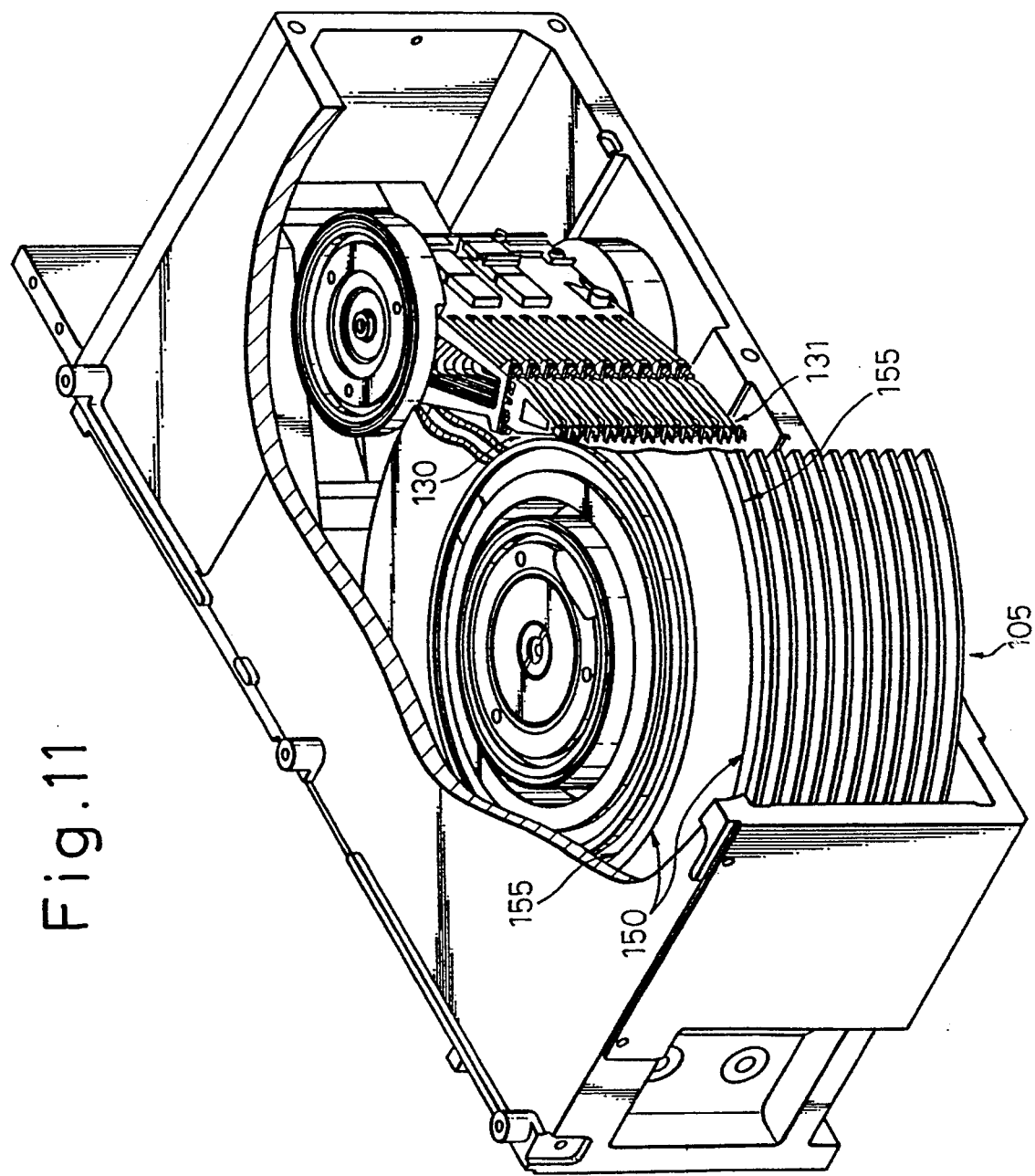
FIG. 11 is a perspective view, partially cut away, showing a mechanism of a magnetic disk drive.

Here, in order to facilitate understanding of the embodiments according to the present invention, a perspective view, partially cut away, showing a mechanism of one magnetic disk drive is illustrated in FIG. 11. As seen from this figure, a plurality of disks 105 are rotated simultaneously. The tracks on a recording surface of each disk 105 are written with a predetermined data pattern. However, the tracks at both ends of the inner zone and the outer zone of the disk 105 are formed as guard bands 150 in which a particular pattern is written, instead of a data pattern, which particular pattern is used for stopping a seek operation of two kinds of heads 130 and 131. These heads 130, 131 are provided on the upper and lower surfaces of each disk 105, respectively. Further, at the inner and the outer sides of the guard band 150, an erase zone 155 is formed for mechanically stopping the heads 130 and 131.

Figure 12:
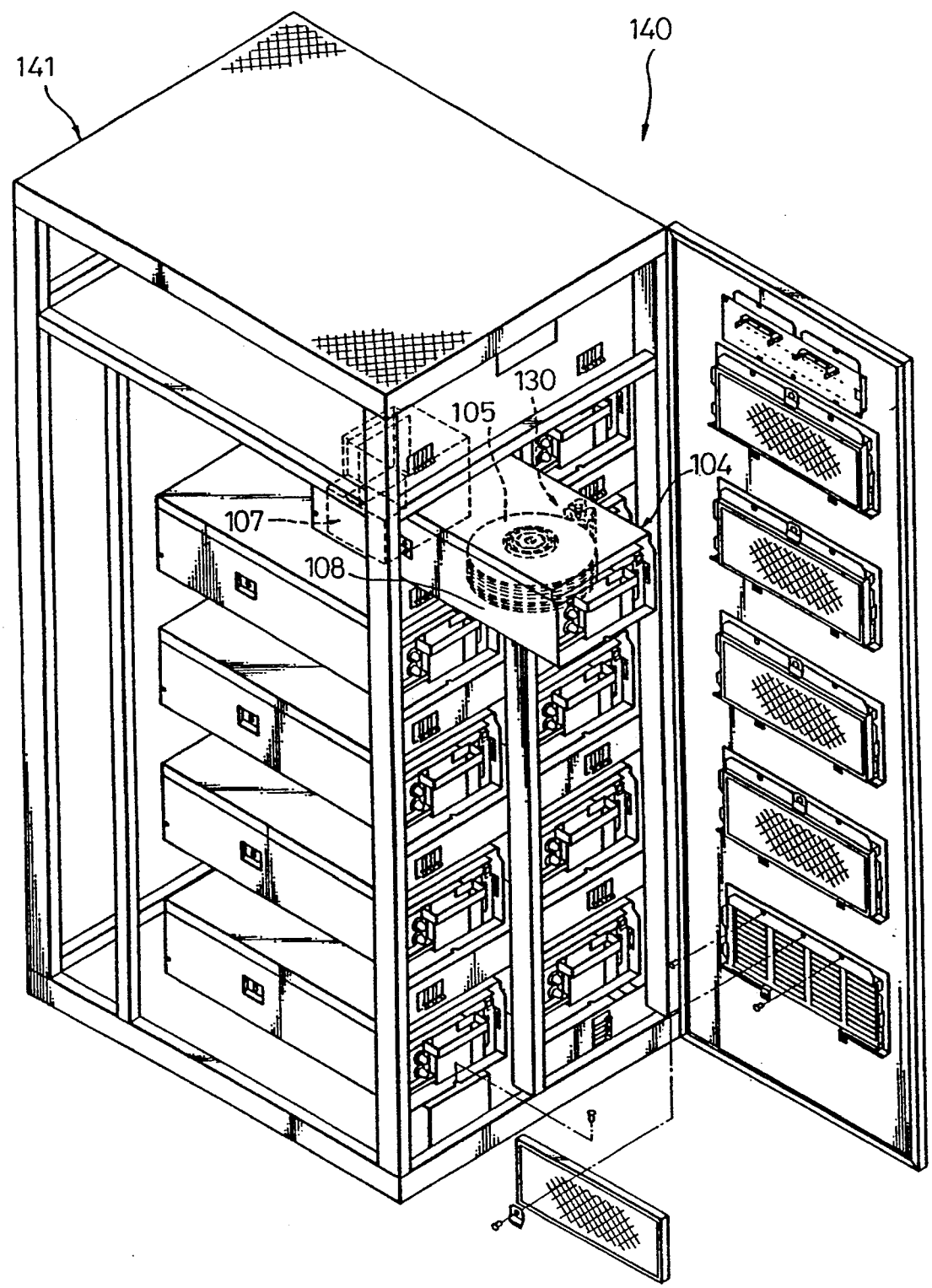
FIG. 12 is a perspective view showing an overall magnetic disk array device.

Preferably, the present invention is adopted to a disk array device 140 as shown in FIG. 12, wherein reference numeral 104 denotes a magnetic disk drive that includes the disks 105 and 141 a housing that can accommodate a plurality of magnetic disk drives. In this case, the disk array device is composed of eight disk drives for data transfer, one parity disk drive and one spare storage disk drive.

The magnetic disk drives 104 constituting each unit of the disk array device comprise a disk module 108. The disk module 108 serves to contain the disks 105 and a power supply box module 107 inside the disk module 108 per se.

Each magnetic disk drive 104 is constructed to be easily inserted into the housing 141 and also easily removed therefrom, so that a maintenance operation can be rapidly performed when a failure, etc., has occurred.

Figure 13:
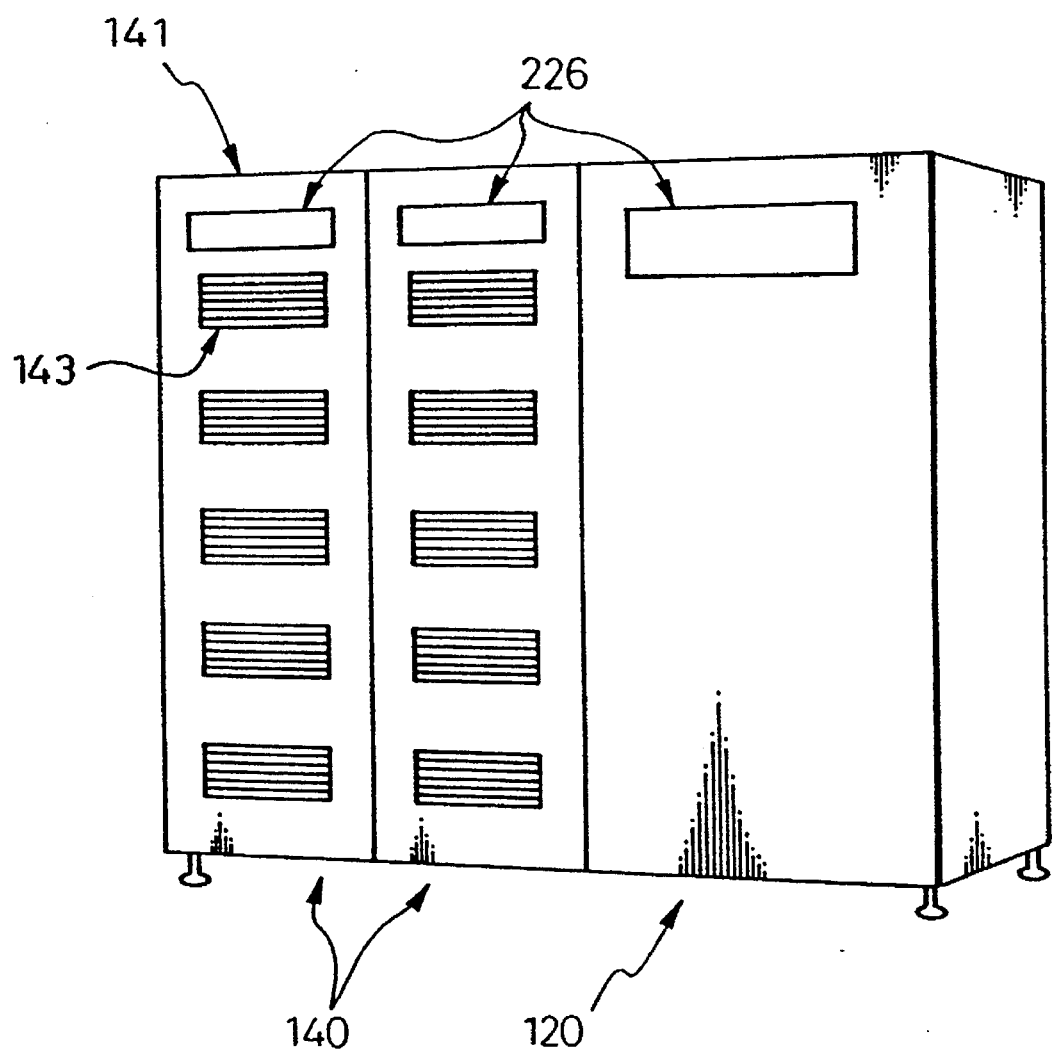
FIG. 13 is a perspective view showing an appearance of a plurality of disk array devices to which the present invention is applied.

Further, in order to clarify the whole construction of a disk array system to which the present invention is applied, the appearance of a plurality of disk array devices including the operation panel 226 is illustrated in FIG. 13.

In FIG. 13, a disk array system is constituted by a plurality of disk array devices, e.g., two disk array devices 140 and a disk array controller 120 for controlling these disk array device 140. The two disk array drives 140 and the disk controller are arranged to be contained in a housing 141. In this case, the front side of the housing 141 at each disk array device 140 is provided with the operation panel 226, in addition to a plurality of ventilation windows 143 for radiating heat generated from a plurality of disk drives. Further, the front side of the housing 141 at the disk controller 120 is also provided with the operation panel 226.

Figure 14:
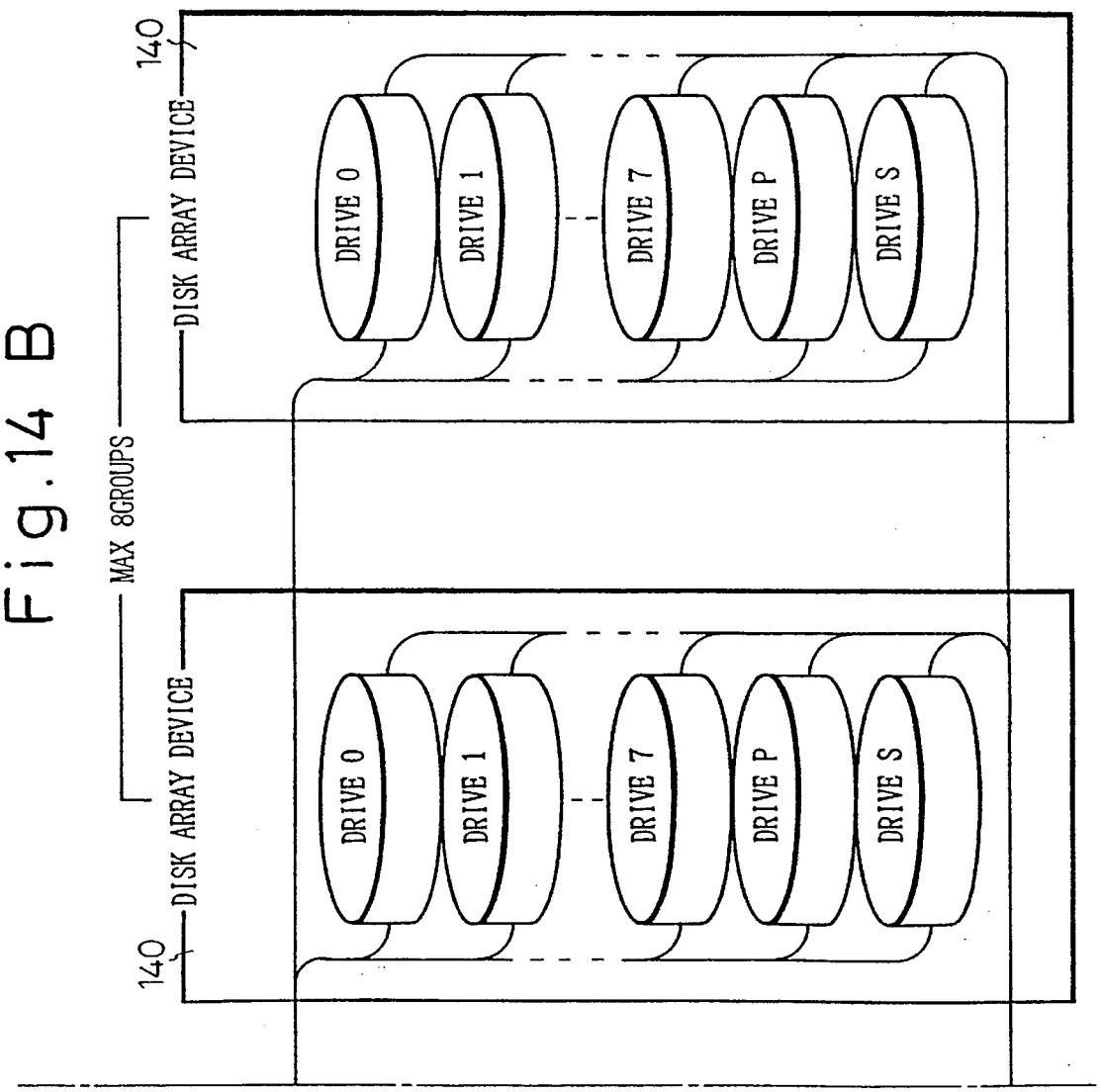
FIGS. 14(A) and 14(B) are block diagrams of a disk controller and the overall disk array devices, respectively.

Finally, block diagrams of a disk array controller 120 and a plurality of disk array devices 140 controlled by the disk array control unit 120 are illustrated in FIGS. 14(A) and 14(B), respectively. In this case, eight disk drives at maximum can be controlled by the disk array controller 120 having a plurality of directors.

In FIG. 14(A), high-speed optical channels A, B, C and D, and channel interface controller, e.g., high-speed optical control modules each functioning as an optical/electric interface (O/E interface), are provided to enable data to be transferred at high speed between the channel and the disk array devices 140. The disk array controller 120 consists of two directors. Each director consists of two modules: the optical control module as described above; and an array control module to control the disk array devices 140.

The latter module is divided into ten device controllers to control the respectively corresponding disk drives (Drive 0 -7, Drive P and Drive S as shown in FIG. 14(B)) and an array controller to transfer the data to or from each of the device controllers.

The two directors in the disk array controller are independent of each other. These directors can control two groups of disk array devices simultaneously.

In this case, the operation panel 226 (FIG. 13) can display the status information of each of two disk array devices.

I claim:

1. An apparatus for ensuring data written to and read from an external storage system comprising:

a host device;

at least one external storage device for writing and reading data to and from a recording medium, said external storage device having a device controller including a buffer and a check data verification circuit; and a data transfer external storage controller disposed between said host device and said device controller for controlling said external storage device in accordance with a command issued from a host device, said external storage controller transferring read data from said device controller to said host device and transferring write data from the host device to said device controller;

wherein said external storage controller adds check data to said write data from said host device, each time write data is transferred from said host device to said external storage device, said storage controller calculating said check data using distinctive information on a position of said external storage device in which said write data is written as a seed value so that said check data is representative of both data content and location, and wherein said external storage controller transfers said write data, to which said check data is added, to said device controller, and said device controller buffers the data in said buffer, and said check data verification circuit verifies that the write data is correct using said check data, said device controller further transferring said write data and said check data to said external storage device if the check data circuit verifies that the write data is correct.

2. An apparatus as set forth in claim 1, wherein said external storage controller comprises:

means for calculating said check data for checking said write data by using the distinctive information on a position of the external storage device in which said write data is written as a seed value, while controlling said write data;

means for calculating control check data from said read data by using the distinctive information on a position of the external storage device from which said read data is read as another seed value, while controlling said read data;

comparing means for comparing said calculated control check data with said check data already included in said read data.

3. An apparatus as set forth in claim 2, wherein said check data is a cyclic redundancy check code.

4. An apparatus as set forth in claim 1, wherein said data is stored in said external storage device in a fixed block address.

5. An apparatus as set forth in claim 1, wherein said data is stored in said external storage device in an FBA format.

6. An apparatus as set forth in claim 1, wherein said external storage controller is an array storage device including a host interface controller and a plurality of device controllers to which a plurality of external storage devices are connected, respectively, wherein said apparatus is operative to write said write data in said external storage devices by generating said check data in said host interface controller and by comparing said check data with control check data in said device controllers, and wherein said apparatus is operative to transfer said read data to said host device by comparing said check data with control check data in said device controllers and in said host interface controller.

7. An apparatus as set forth in claim 6, wherein said check data is a cyclic redundancy check code.

8. A method for ensuring data written to and read from an external storage system including at least one external storage device having a device controller including a buffer and a check data verification circuit for writing and reading data to and from a recording medium, a data transfer external storage controller for controlling said external storage device in accordance with a command issued from a host device, said external storage controller transferring read data from said external storage device controller to said host device and transferring write data from the host device to said external storage device controller, wherein said method comprises:

a step of adding check data to said write data from said host device, each time write data is transferred from said host device to said external storage device, said check data being calculated in said external storage controller using distinctive information on a position of said external storage device in which said write data is written as a seed value so that said check data is representative of both data content and location;

a step of transferring said write data to which said check data is added to said external storage device controller;

a step of buffering said write data in said buffer and checking said write data using said check data; and a step of transferring said write data and said check data to said external storage device if the check data verification circuit verifies that the write data is correct.

9. A method as set forth in claim 8, wherein said method includes:

a step of calculating said check data for checking said write data by using the distinctive information on a position of the external storage device in which said write data is written as a first seed value, while said write data is controlled by said external storage controller;

a step of calculating control check data from said read data by using the distinctive information on a position of the external storage device from which said read data is read as another seed value, while said read data is controlled by said external storage controllers; and a step of comparing said calculated control check data with said check data already included in said read data.

10. A method as set forth in claim 9, wherein said check data is a cyclic redundancy check code.

11. A method as set forth in claim 8, wherein said external storage controller is an array storage device including a host interface controller and a plurality of device controllers to which a plurality of external storage devices are connected, respectively, wherein said write data is written in said external storage devices after generating said check data in said host interface controller and comparing said check data to control check data in said device controllers, and wherein said read data is transferred to said host device after comparing the check data to control check data in said device controllers and then in said host interface controller.

12. An apparatus for ensuring data written to and read from an external storage system comprising:

at least one external storage device for writing and reading data to and from a recording medium which is divided into a plurality of sectors, said external storage device including a device controller having a buffer and a check data verification circuit; and a data transfer external storage controller for controlling said external storage device in accordance with a command issued from a host device, said external storage controller transferring read data from said external storage controller device to said host device and transferring write data from the host device to said external storage device controller;

wherein said external storage controller calculates check data, each time write data is transferred from said host device, using distinctive information on a position of a specified sector of said external storage device in which said write data is written as a seed value so that said check data is representative of both data content and location, and wherein said external storage controller transfers said write data to said external storage device controller, and said device controller buffers the data in said buffer, and said check data verification circuit verifies that the write data is correct using said check data, said device controller further transferring said write data and said check data to said external storage device if the check data verification circuit verifies that the write data is correct.

13. A method for ensuring data written to and read from an external storage system including at least one external storage device having a device controller including a buffer and a check data verification circuit for writing and reading data to and from a recording medium, and a data transfer external storage controller for controlling said external storage device in accordance with a command issued from a host device, said external storage controller transferring read data from said external storage device controller to said host device and transferring write data from the host device to said external storage device controller, wherein said method comprises:

a step of calculating check data, each time write data is transferred from said host device to said external storage device, said check data being calculated in said external storage controller using distinctive information on a position of a specified sector of said external storage device in which said write data is written as a seed value so that said check data is representative of both data content and location;

a step of transferring said write data to said external storage device controller;

a step of buffering said write data in said buffer and checking said write data using said check data; and a step of transferring said write data and said check data to said external storage device if the check data verification circuit verifies that the write data is correct.

* * * * *

UNITED STATES PATENT AND TRADEMARK OFFICE
CERTIFICATE OF CORRECTION

Page 1 of 2

PATENT NO. : 5,588,012
DATED : December 24, 1996
INVENTOR(S) : Oizumi

It is certified that error appears in the above-indentified patent and that said Letters Patent is hereby corrected as shown below:

Column 3, line 2, after"block", insert --(-- .

Column 3, line 3, after "block", insert --(-- .

Column 6, line 61, after "3", delete ".".

Column 7, line 67, after "207", delete """ .

Column 8, line 66, delete "are" and insert -- is--.

UNITED STATES PATENT AND TRADEMARK OFFICE
CERTIFICATE OF CORRECTION

PATENT NO. : 5,588,012 Page 2 of 2
DATED : December 24, 1996
INVENTOR(S) : Oizumi It is certified that error appears in the above-indentified patent and that said Letters Patent is hereby corrected as shown below:

Column 11, line 6, delete "are" and insert

--is--.

Column 16, lines 4-5, delete "fixed block address" and insert --FBA--.

Signed and Sealed this

Eighteenth Day of November 1997

Attest:

BRUCE LEHMAN

Attesting Officer    Commissioner of Patents and Trademarks